United States Patent
Yamamoto et al.

(10) Patent No.: US 7,748,907 B2
(45) Date of Patent: Jul. 6, 2010

(54) BEARING SEAL AND SWING DEVICE

(75) Inventors: Hiroshi Yamamoto, Hiratsuka (JP); Ryuusuke Komura, Hiratsuka (JP); Jun Maruyama, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/366,374

(22) Filed: Feb. 5, 2009

(65) Prior Publication Data

US 2009/0148089 A1 Jun. 11, 2009

Related U.S. Application Data

(62) Division of application No. 10/555,165, filed as application No. PCT/JP2004/006322 on Apr. 30, 2004, now Pat. No. 7,513,690.

(30) Foreign Application Priority Data

May 2, 2003 (JP) .............................. 2003-126973
Aug. 12, 2003 (JP) .............................. 2003-292022

(51) Int. Cl.
*F16C 33/72* (2006.01)
*F16J 15/32* (2006.01)

(52) U.S. Cl. ...................... 384/147; 384/151; 277/553; 277/572

(58) Field of Classification Search ................. 384/130, 384/139–141, 143, 147–151; 277/549, 551, 277/553, 572
See application file for complete search history.

(56) References Cited

U.S. PATENT DOCUMENTS

| 2,606,779 | A | 8/1952 | Jagger |
| 2,859,071 | A | 11/1958 | Riehl et al. |
| 3,168,319 | A | 2/1965 | Paulsen |
| 3,848,881 | A | 11/1974 | Ginn |
| 5,380,016 | A | 1/1995 | Reinsma et al. |
| 6,042,272 | A | 3/2000 | Nagase |
| 6,866,271 | B2 | 3/2005 | MacDonald |
| 2003/0102635 | A1 | 6/2003 | Akita et al. |

FOREIGN PATENT DOCUMENTS

| JP | 55-147564 U | 10/1980 |
| JP | 2-36657 U | 3/1990 |
| JP | 3-108932 U | 11/1991 |
| JP | 4-102769 A | 4/1992 |
| JP | 6-201056 A | 7/1994 |
| JP | 2001-50395 A | 2/2001 |

*Primary Examiner*—Thomas R Hannon
(74) *Attorney, Agent, or Firm*—Frishauf, Holtz, Goodman & Chick, P.C.

(57) ABSTRACT

A bearing seal includes an outer seal easily displaceable in the radial direction, an inner ring as a ring-shaped rigid portion not extendable in the radial direction, an inner seal having a seal lip, and an outer ring arranged on the outer peripheral portion of the outer seal, in which the spring constant of the inner seal is set to be larger than the spring constant of the outer seal. The sealing performance between the inner seal and the pin is ensured by using the ring-shaped rigid portion as a boundary. When the pin is displaced in the radial direction, the ring-shaped rigid portion is integrally displaced with the pin via the inner seal, and the displacement of the ring-shaped rigid portion can be absorbed by the outer seal.

12 Claims, 39 Drawing Sheets

RELATION BETWEEN RESTORING FORCE AND
BACKLASH QUANTITY OF OUTER SEAL

BEARING SEAL AND SWING DEVICE

CROSS-REFERENCE TO RELATED APPLICATIONS

The present application is a Divisional Application of U.S. application Ser. No. 10/555,165 filed Nov. 1, 2005 now U.S. Pat. No. 7,513,690, incorporated herein by reference and which is a U.S. National Phase Application under 35 USC 371 of International Application PCT/JP2004/006322 filed Apr. 30, 2004.

TECHNICAL FIELD

The present invention mainly relates to a bearing seal used in a pin hinge joint for a construction machine such as a hydraulic excavator.

BACKGROUND ART

In a hydraulic excavator as a construction machine, a boom and an arm, as well as an arm and a bucket, are swingably coupled by a pin.

In a coupling section coupled by the pin, namely in a pin hinge joint, lubricant oil such as grease is injected into between the pin and a boss to make the swinging motion smooth, as well to prevent the wear and noise caused by metal contact.

Further, a bearing seal called radial seal is used to prevent earth and the like from entering through between the pin and the boss, as well as to prevent the lubricant oil from leaking out from a clearance between the pin and the boss.

An example of such a bearing seal is described in, for example, U.S. Pat. No. 5,380,016.

The bearing seal as described in the document has, as shown in FIG. 43, an outer seal 1 called flex ring, an inner ring 2 called tension ring, and a inner seal 3 called seal ring. The outer seal 1 fits to a boss 4, and the inner seal 3 is attached so as to be brought into contact with a pin 5.

In the bearing seal, a fixing ring 6 called mounting is arranged on the outer periphery of the outer seal 1 to make the outer seal 1 easy to be fitted to the boss 4.

In the bearing seal as described in the document, when mounting the inner seal 3 to the pin 5, the inner ring 2 is extended in the radial direction so that the diameter thereof is enlarged, and the inner seal 3 is brought into press-contact with the pin 5 by fastening force of the inner ring 2 due to shrinkage. Thus, a large surface pressure (namely, seal surface pressure) of 20 N/cm, for example, in the radial direction is generated in the inner seal 3.

For this reason, a material having high tensile modulus of, for example, 300 to 14,000 MPa and high elongation of, for example, 5% or higher is used for the inner ring 2.

Since the seal surface pressure applied to the inner seal 3 is generated by the fastening force of the inner ring 2, the inner seal 3 is required to be provided with two seal lips of a seal lip 3a and a stabilizer lip 3b to improve the sealing performance.

If the seal lip is formed by one piece only, since the inner ring 2 will not evenly shrink in width direction (the axial direction of the pin 5), and the fall of the seal lip will occur, so that the seal lip will not be properly brought into press-contact with the pin 5, thus the sealing performance will deteriorate. By adding the aforementioned stabilizer lip 3b, the inner ring 2 can evenly shrink in width direction, and the seal lip can be properly brought into press-contact with the pin 5, thus good sealing performance in normal time can be obtained.

Since the seal lip 3 has the inner seal 3a and the stabilizer lip 3b as described above, when the pin 5 and the boss 4 rotate against each other, frictional force will be generated in two places, that is, the inner seal 3a and the stabilizer lip 3b, so that the frictional force becomes great.

The outer seal 1 is made strong to resist the great frictional force. In other words, if the frictional force becomes great, when the pin 5 and the boss 4 rotate against each other, a great rotating force acts on the outer seal 1. The outer seal 1 may be damaged if it is weak, therefore, as described above, the outer seal 1 is made strong so as not to be damaged.

There is a clearance between the boss 4 and the pin 5, and when subjected to vibration caused by impact, the pin 5 can move in the radial direction by an amount equal to the clearance.

If the inner seal 3 displaces in the radial direction following the movement (displacement) of the pin 5 in the radial direction, then the sealing performance can be maintained. However since the inner seal 3 is brought into press-contact with the pin 5 by the fastening force of the inner ring 2, and further, since the outer seal 1 is strong and difficult to be displaced in the radial direction, the inner seal 3 can not be displaced in the radial direction following the displacement of the pin 5 in the radial direction.

Thus, a gap will be generated between the seal lip 3a of the inner seal 3 and the pin 5 due to the displacement of the pin 5 in the radial direction, so that sealing performance will deteriorate, and earth and sand will enter from the seal section, and the lubricant oil will leak out.

In a construction machine such as a hydraulic excavator, since the vibration caused by impact is great, the pin 5 of the bearing seal of the pin hinge joint is repeatedly displaced in the radial direction at high speed.

When the pin 5 is displaced to one side in the radial direction (for example, to the upper side in FIG. 43), since the outer seal 1 is difficult to be displaced, one side of each of the inner seal 3 and the inner ring 2 (for example, the side of the upper half in FIG. 43) in the radial direction will be displaced due to being pressurized by the pin 5. On the other hand, since the speed of the displacement of the pin 5 is high, and further, since the outer seal 1 is difficult to be displaced, the other side of the inner seal 3 and the inner ring 2 (for example, the side of the lower half in FIG. 43) in the radial direction will delay in following the displacement of the pin 5, so that the seal lip 3a will fail in keeping press-contact state with the pin 5, and the seal lip 3a will detach from the pin 5.

Thus, the sealing performance of the bearing seal as described in the document is good in normal time, but bad when subjected to vibration caused by impact.

In this type of seal having a inner seal, since the grease is difficult to leak out from between the inner seal and the pin when performing grease up work, the completion of the grease up work can not be confirmed.

Further, when the sealing performance becomes bad, earth and sand will become easy to enter, and the grease will leak out, therefore the durability of the pin hinge joint will be lowered, and the grease has to be supplied frequently.

In view of the foregoing, it is an object of the present invention to provide a bearing seal not only whose sealing performance is good in normal time, but whose sealing performance can be prevented from being deteriorated when subjected to vibration caused by impact, and also, whether or not a grease or the like is properly injected can be confirmed.

DISCLOSURE OF THE INVENTION (1) The bearing seal in accordance with one embodiment of the present invention includes an outer seal; a ring-shaped rigid portion; and an inner seal made of elastic material; in which the ring-shaped rigid portion is arranged between the inner seal and the outer seal.

Herein, the ring-shaped rigid portion of this aspect of the present invention is not necessary to be an independent member as the inner ring, but can be formed including a part of the outer seal and/or the inner seal by increasing the thickness in the radial direction of a part of the member constituting the inner seal and/or the outer seal, or by transubstantiating a part of the member to increase the hardness thereof.

According to the aspect of the present the invention, since the inner seal made of elastic material is arranged inside the ring-shaped rigid portion that is not extendable in the radial direction, when the bearing seal is mounted to a shaft, the inner seal is supported by the ring-shaped rigid portion, and a seal surface pressure in the axial direction will be generated.

Accordingly, it is possible to bring the inner seal into proper press-contact with a pin (the shaft), and therefore good sealing performance in normal time can be maintained Thus, when the bearing seal is mounted to the shaft supported by a bearing, a gap is prevented from being generated at a contacting portion of the shaft and the inner seal, therefore earth and the like is prevented from entering, and the lubricant oil such as the grease is prevented from leaking out from the gap.

(2) The bearing seal in accordance with another embodiment of the present invention includes an outer seal; a ring-shaped rigid portion; and an inner seal made of an elastic material; in which the ring-shaped rigid portion abuts on at least one of the inner seal and the outer seal.

According to this aspect of the present invention, the same advantages as described above can be expected.

(3) The bearing seal in accordance with another embodiment of the present invention includes an outer seal; a ring-shaped rigid portion; and an inner seal made of an elastic material; in which the ring-shaped rigid portion is arranged so that all or a part thereof is embedded into at least one of the inner seal and the outer seal.

According to this aspect of the present invention, the same advantages as described above can be expected.

(4) In a bearing seal in accordance with another embodiment of the present invention, the ring-shaped rigid portion is constituted by increasing a radial thickness of a part of the member of either one of the inner seal and the outer seal, or by transubstantiating the part of the member to increase the hardness thereof.

Herein, the ring-shaped rigid portion can be constituted, for example, by increasing the thickness of the contacting portion of the inner seal to the outer seal, or by increasing the hardness of a contacting portion of the inner seal to the outer seal by performing a proper hardening process such as a thermosetting process, or by increasing the thickness of a contacting portion of the outer seal to the inner seal, or by increasing the hardness of the contacting portion of the outer seal to the inner seal by performing a proper hardening process such as a thermosetting process.

According to this aspect of the present invention, since the bearing seal is constituted using the material for inner seal and the material for outer seal only, the bearing seal can be produced without using the material for a separate ring-shaped rigid portion.

(5) In a bearing seal in accordance with another embodiment of the present invention the ring-shaped rigid portion is formed as a separate member.

Herein, the ring-shaped rigid portion formed as the separate member can be made from a ring-shaped member made of plastic, carbon, SPC steel or the like.

Further, the ring-shaped rigid portion formed as the separate member can be arranged inside the contacting portion of the inner seal to the outer seal, or be sandwiched by the contacting portion of the inner seal to outer seal, or be arranged between the contacting portion of the inner seal and the contacting portion of the outer seal, or be arranged so as to straddle the contacting portion of the inner seal and the contacting portion of the outer seal.

According to this aspect of the present invention, by separately forming the ring-shaped rigid portion, it becomes possible to select the material most suitable to the ring-shaped rigid portion corresponding to the force acting on the bearing, therefore the sealing performance of the inner seal can be securely maintained by using a most suitable ring-shaped rigid portion.

(6) In a bearing seal in accordance with another embodiment of the present invention, when a shaft is radially displaced relative to a bearing, the outer seal is more deformed than the inner seal.

Herein, the outer seal can be formed by a sheet-like member that is larger than the size of the clearance between the shaft and the bearing and generates sagging when being mounted, or by a bellows-like member or an elastic member which expands and contracts corresponding to the change of the size of the clearance between the shaft and the bearing.

According to this aspect of the present invention, since the ring-shaped rigid portion does not extend in the radial direction, and since the outer seal is easier to be displaced in the radial direction than the inner seal, when the pin (the shaft) moves in the radial direction by an amount equal to the clearance between the pin and the boss (the bearing), the outer seal can be displaced in the radial direction following the displacement of the pin. Thus, the inner seal becomes difficult to separate from the pin.

Thus, it is possible to provide a bearing seal not only whose sealing performance can be kept in good condition in normal time, but whose sealing performance can be prevented from being deteriorated when subjected to vibration caused by impact.

(7) In a bearing seal in accordance with another embodiment of the present invention, a spring constant of the elastic material of the inner seal is approximately five or more times as great as a spring constant of the outer seal.

According to this aspect of the present invention, since the outer seal is made of the material easily deformable compared to that of the inner seal, and the spring constant of the inner seal is approximately five times as great as that of the outer seal, the outer seal can deform corresponding to the displacement between the bearing and the shaft so as to maintain the sealing performance.

Further, by setting the spring constant of the inner seal to approximately five times or more as great as that of the outer seal, the displacement of the pin can be followed even when the displacement speed of the pin in the radial direction becomes 2 m/s or more.

(8) In a bearing seal in accordance with another embodiment of the present invention the outer seal is made of the elastic material.

According to this aspect of the present invention, since the outer seal is made of elastic material, when the bearing and the shaft rotate against each other, the outer seal will not be caught in clearance between the bearing and the shaft when rotating, therefore the rotation of the bearing can be secured. Further, the outer seal can be made small compared to the case where a bellows-like member is used.

(9) In a bearing seal in accordance with another embodiment of the present invention the ring-shaped rigid portion satisfies an inequality of L'<1.05 L, in which L is the circumferential length of the rigid portion before being mounted to the shaft supported by a bearing, and L' is a circumferential length of the rigid portion after being mounted to the shaft.

According to this aspect of the present invention, since the deformation of the ring-shaped rigid portion is restrained to 5% or less, the sealing performance of the inner seal can be securely maintained owing to the ring-shaped rigid portion.

(10) In a bearing seal in accordance with another embodiment of the present invention a width dimension W of a cross section of the ring-shaped rigid portion in a direction perpendicular to a radial direction is larger than approximately half of a width dimension h of a cross section of the inner seal in a radial direction.

According to this aspect of the present invention, the displacement of the pin can be followed even when the displacement speed of the pin in the radial direction becomes 2 m/s or more.

(11) In a bearing seal in accordance with another embodiment of the present invention, the inner seal has a seal lip which, when being mounted to a shaft supported by a bearing, extends in the direction inclined to an axial direction of the shaft to contact an outer circumference of the shaft.

According to this aspect of the present invention, since the seal lip is abutted on the shaft in the direction inclined to the axial direction, when the shaft is displaced relative to the bearing in the radial direction, the sealing performance can be maintained with proper biasing force, and also, when the bearing and the shaft rotate against each other, the sliding performance between the shaft and the bearing is secured, so that the shaft can be smoothly rotated against the bearing.

Further, since the inner seal will be displaced in the radial direction due to the pressure of the injected grease, the grease can leak out from the contacting portion displaced in the radial direction. In other words, whether or not the grease is properly injected can be confirmed by checking whether or not the grease leaks out when injecting the grease.

(12) In a bearing seal in accordance with another embodiment of the present invention, the inner seal has a seal lip having a chevron shaped cross section, which becomes, when being mounted to a shaft supported by a bearing, gradually narrower toward a distal end side thereof facing an outer circumference of the shaft.

According to this aspect of the present invention, since the two seal lips structure constituted by a seal lip and a stabilizer lip, such as the structure a conventional inner seal has, is not necessary, the frictional force can be reduced when the pin and the boss rotate against each other.

(13) In a bearing seal in accordance with another embodiment of the present invention, the bearing seal further includes an outer ring made of a ring-shaped rigid material, the outer ring surrounding the outer seal.

According to this aspect of the present invention, by providing the outer ring which is made of rigid material so as to surround the outer seal, since the displacement of the outer seal in the axial direction can be prevented by the outer ring, when the grease or the like is being injected into between the pin and the boss, the inner seal will not be displaced in the axial direction together with the outer seal by the injected grease. Thus, the inner seal is prevented from being displaced in the axial direction together with the outer seal, which is displaced in the axial direction by the injected grease.

(14) The swing device in accordance with another embodiment of the present invention includes a shaft mounted on a first member, a bearing mounted on a second member and rotatably supporting the shaft, and a bearing seal arranged outside a bearing surface in an axial direction for sealing an inside including the bearing surface from an outside, the bearing seal being the bearing seal according to any one of the embodiments described above.

According to this aspect of the present invention, as described above, even when the displacement between the shaft and the bearing is generated, the sealing performance between the inside and the outside can be ensured by the bearing seal, therefore in the swing device, dust and the like can be prevented from entering from between the shaft and the bearing, and the lubricant oil can be prevented from leaking out through the gap. Accordingly, the invention can preferably be applied to a pin hinge joint for connecting a boom and an arm of a construction machine and the like, as well as an arm and a bucket of the same.

(15) In a swing device in accordance with another embodiment of the present invention, the bearing is provided with, outside the bearing seal, a stopper member for restricting an axial displacement of the bearing seal.

Herein, a flange member projected from the bearing seal mounting part of the bearing toward shaft side, a shim arranged in the clearance between the bearing and the shaft, or the like can be used as a stopper member.

According to the aspect of the present of the invention, by bringing the ring-shaped rigid portion into contact with the stopper member such as a flange member or a shim, the displacement of the outer seal and the inner seal in the axial direction can be prevented, and the structure of the bearing seal can be simplified.

BEST MODE FOR CARRYING OUT THE INVENTION

Embodiments of the present invention will be described below with reference to attached drawings.

(1) First Embodiment (1-1) Entire Configuration of Swing Device 100

Figure 1:
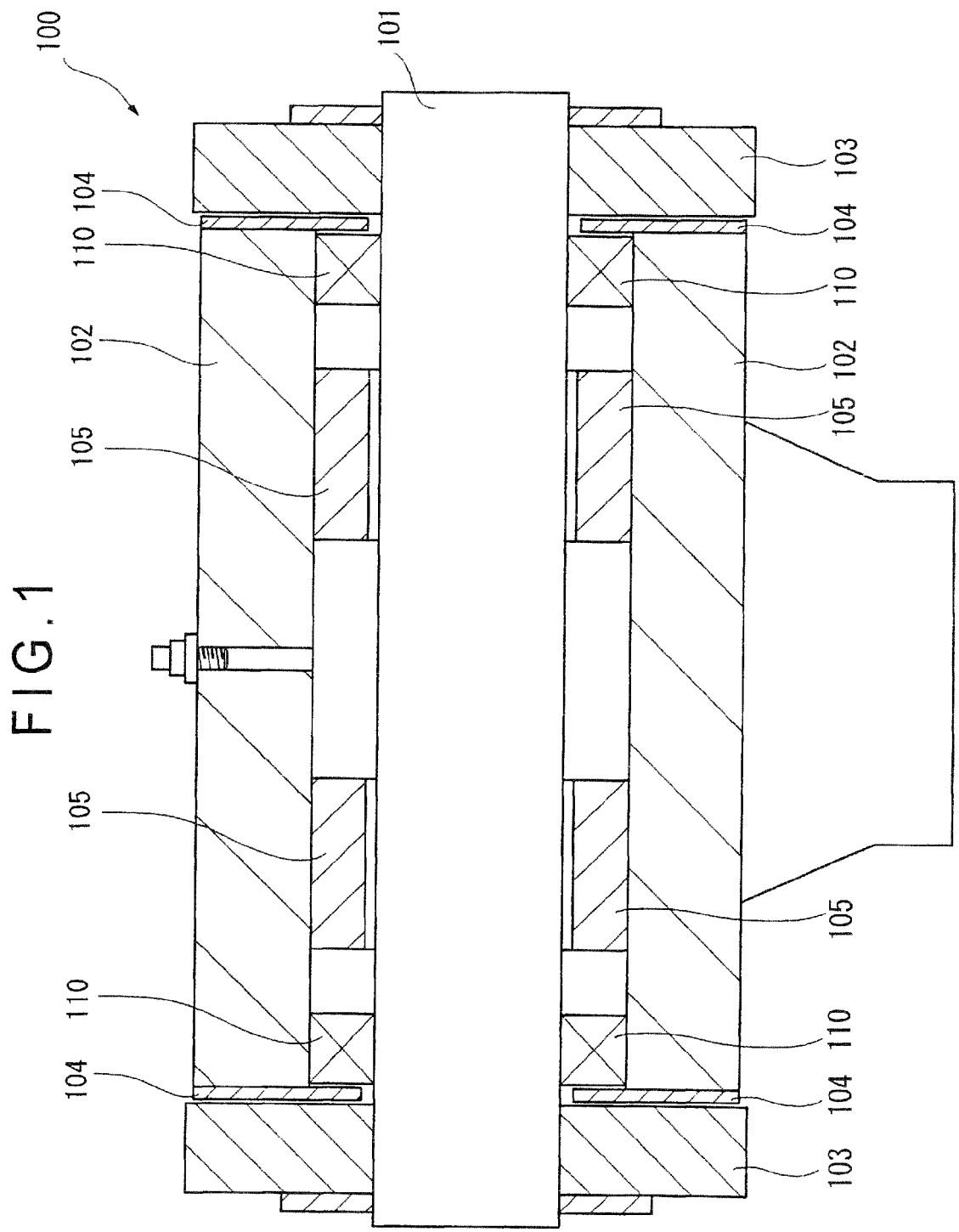
FIG. 1 is a cross section showing a swing device in a first embodiment of the present invention.

FIG. 1 shows a swing device 100 in a first embodiment of the present invention. The wing device 100 is used as a pin hinge joint for coupling a boom and an arm of a hydraulic excavator. For example, the arm as one member is provided with a pin 101 as a shaft, and the boom as the other member is provided with a boss 102 as a bearing.

The pin 101 is formed by a column-shaped steel material, and the pin 101 is fixed to brackets 103 provided at the end of the arm with bolts and nuts.

The boss 102 is formed by a cylindrical steel material with the pin 101 being inserted thereinside. The inner diameter of the boss 102 is larger than the outer diameter of the 101, and therefore a clearance is formed therebetween. Further, shims 104 as stoppers are provided on the opening portions on ends of the cylindrical boss 102 to cover the clearance.

A bearing portion 105 is provided in the center of the inner peripheral surface of the boss 102, and the pin 101 is supported by the bearing face of the bearing portion 105. Rotation is made between the boom and the arm by sliding the outer peripheral surface of the pin 101 against the bearing face of the bearing portion 105.

In the swing device 100, bearing seals 110 for sealing the cylindrical inner space of the boss 102 from the outer space are provided on the inner sides of the shims 104 outside the bearing portion 105. The inner space of the boss 102 sealed by the bearing seal 110 is sealed with lubricant oil such as grease. The lubricating oil sealed in the inner space of the boss 102 enters the space between the bearing face of the bearing portion 105 and the outer peripheral surface of the pin 101, so that the sliding performance therebetween can be improved, and the swing device 100 can swing smoothly.

(1-2) Structure of Bearing Seal 110

Figure 2:
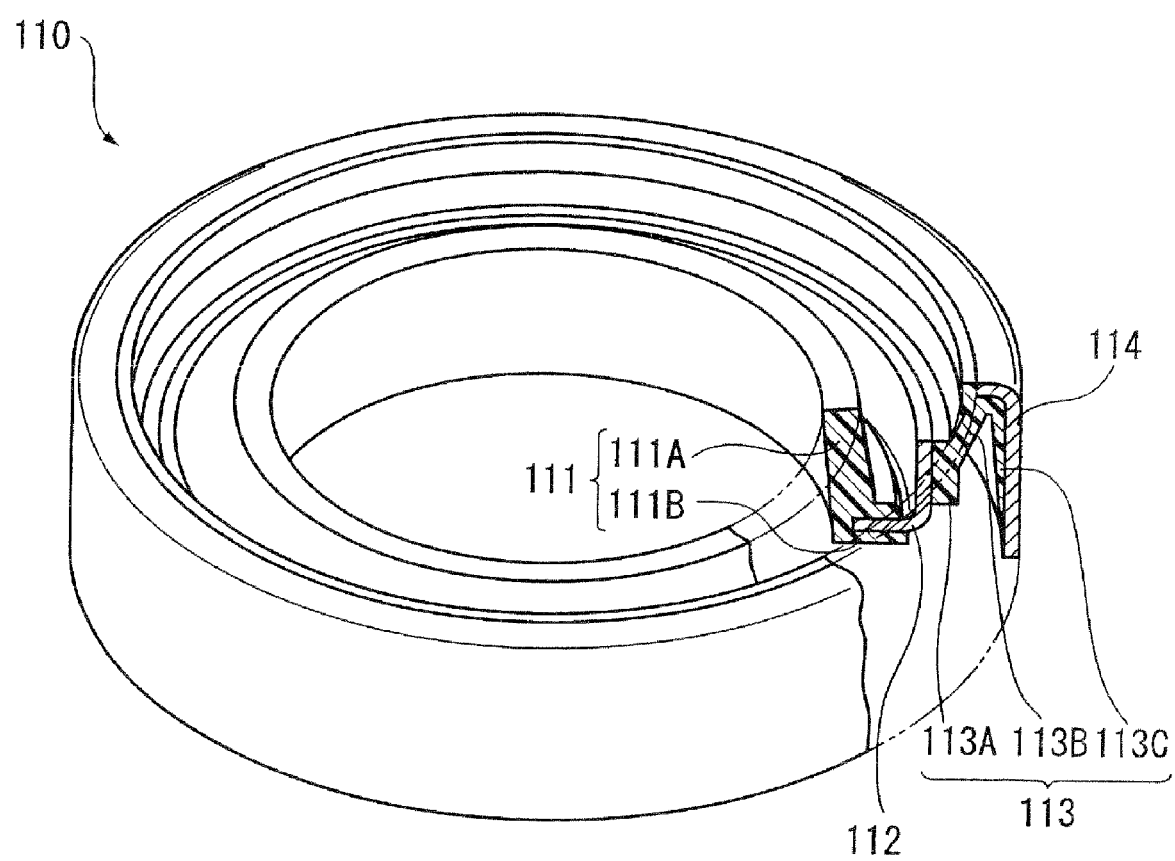
FIG. 2 is a brief perspective view showing the structure of a bearing seal in the aforesaid embodiment.

FIG. 2 shows the detailed structure of the bearing seal 110. The bearing seal 110 is formed by a plurality of ring-shaped members which are different in diameter from each other and combined with each other concentrically. The bearing seal 110 includes, from the inside toward the outside, a ring-shaped inner seal 111, an inner ring 112 as a ring-shaped rigid portion, a ring-shaped outer seal 113, and an outer ring 114. The inner ring 112 is formed between the inner seal 111 and the outer seal 113.

The inner seal 111, which has a substantially L-shaped cross section, has a seal lip 111A extended in the axial direction of the bearing seal 110, and a base 111B that projects from an end of the seal lip 111A toward outside along the radial direction of the bearing seal 110. The inner seal 111 is made of elastic material of polymer materials such as polyurethane or the like, polyurethane hardness of which is 95° or higher.

The seal lip 111A has a substantially truncated cone shape. The base 111B side of the seal lip 111A, namely the proximal end side of the seal lip 111A, has the largest diameter, and diameter becomes small gradually from the proximal end side toward the distal end side in the axial direction of the bearing seal 110.

The inner ring 112 as a ring-shaped rigid portion has a substantially L-shaped cross section to surround the inner seal 111. One section of the L-shaped cross section of the inner ring 112 is embedded into the base 111B of the inner seal 111. The material for the inner ring 112 preferably has high rigidity. For example, SPC steel can be selected as such material. Incidentally, the material for the inner ring 112 is not limited to SPC steel, but can be plastic, carbon or the like as long as the rigidity thereof satisfies the inequality of L'<1.05 L, in which L is the circumferential length of the inner ring 112 before being mounted to the shaft 101, and L' is the circumferential length of the inner ring 112 after being mounted to the shaft 101.

The outer seal 113 is provided so as to surround the inner ring 112. The outer seal 113, which has a substantially C-shaped cross section, includes an inner ring fixing portion 113A, an extending/contracting portion 113B, and an outer ring fixing portion 113C. The outer seal 113 may be made of elastic material easily deformable compared with the inner seal 111, such as NBR with NBR hardness of 30° or higher. In addition to NBR, other material such as silicone rubber, fluororubber or the like may be used to further improve durability. Incidentally, the spring constant of the inner seal 111 is set to approximate five times that of the outer seal 113.

The inner ring fixing portion 113A is fixed to the outer peripheral surface of the other section of the L-shaped cross section of the inner ring 112. The inner ring fixing portion 113A can be fixed to the inner ring 112 by welding or by using adhesive. The outer ring fixing portion 113C is fixed to the outer ring 114 substantially in the same manner as the inner ring fixing portion 113A.

The extending/contracting portion 113B connects the inner ring fixing portion 113A and the outer ring fixing portion 113C. When the relative displacement is generated between the shaft 101 and boss 102, the extending/contracting portion 113B extends/contracts to follow the displacement. The extending/contracting portion 113B extends in the direction inclined to fixing faces of the inner ring fixing portion 113A and the outer ring fixing portion 113C, namely, in the direction inclined to the axial direction of the shaft 101 in the state of being mounted to the shaft 101. Further, a gap is formed between the extending/contracting portion 113B and the outer ring fixing portion 113C, the gap becoming narrow gradually toward the connecting portion. The gap is the inner portion of the C-shaped cross section.

The outer ring 114 has a substantially L-shaped cross section to surround the outer seal 113. The material identical to that for inner ring 112 can be used for the outer ring 114. Further, the outer ring fixing portion 113C of the outer seal 113 is fixed to the outer ring 114 along the inner surface thereof.

(1-3) Mounting State of Bearing Seal 110

Figure 3:
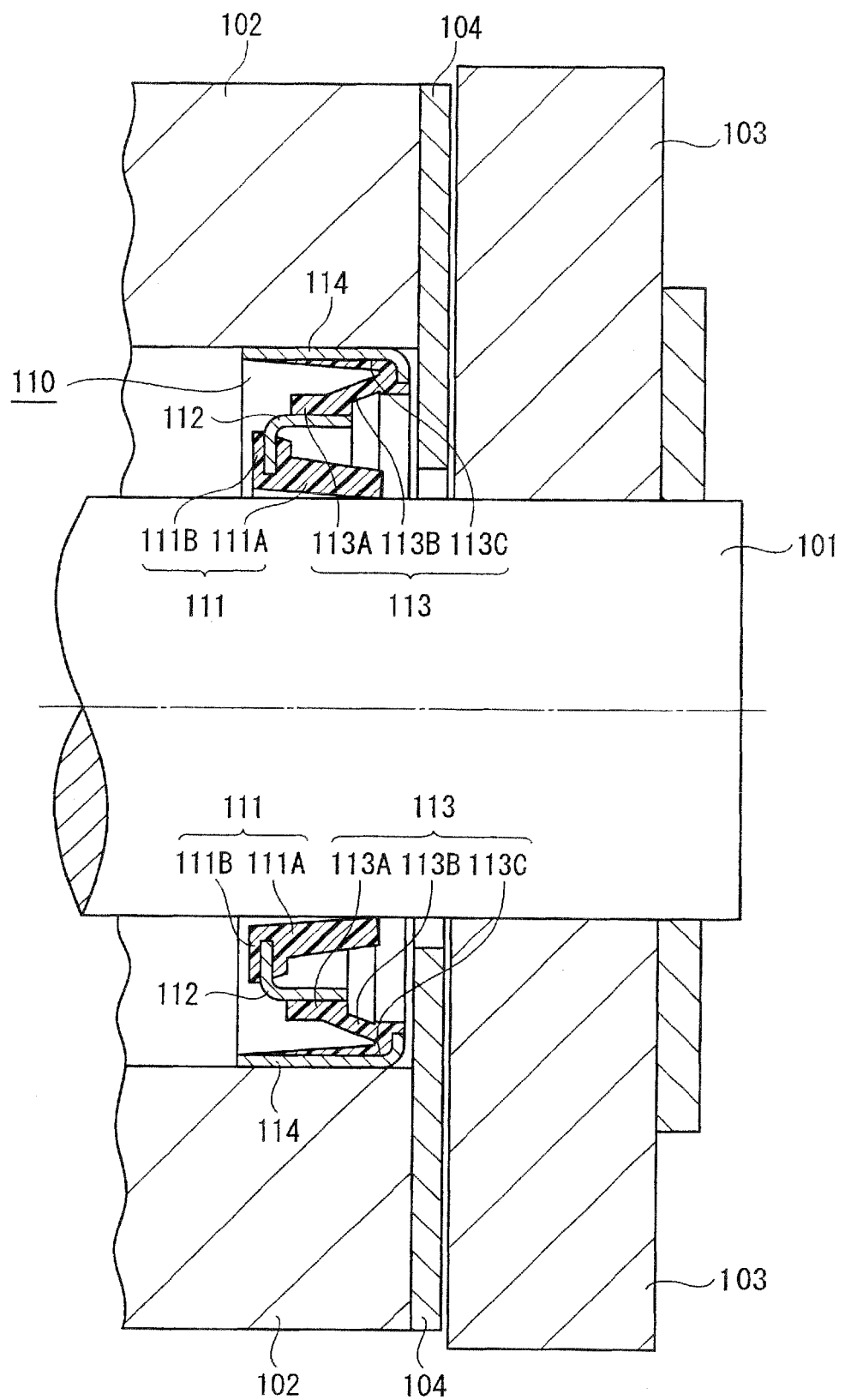
FIG. 3 is a cross section showing the mounting state of a bearing seal in the aforesaid embodiment.

FIG. 3 shows the state where the bearing seal 110 is mounted to the swing device 100.

In the state where the bearing seal 110 is not mounted to the shaft 101, the inner diameter of the seal lip 111A of the inner seal 111 on the proximal end side is larger than the diameter of the shaft 101, while the inner diameter of the seal lip 111A on the distal end side is smaller than the diameter of the shaft 101. Incidentally, the outer diameter of the outer ring 114 is substantially equal to the inner diameter of the boss 102.

When the shaft 101 is being mounted to the bearing seal 110, the shaft 101 is inserted into the bearing seal 110 while expanding the distal end portion of the seal lip 111A until it is moved to a predetermined position.

The outer ring 114 is brought into close contact with the inner peripheral surface of the cylinder of the boss 102 so as to secure the sealing performance; while, as to the inner seal 111, since outward deformation of the inner seal 111 itself in the radial direction is suppressed by the inner ring 112 on the out side, the distal end portion of the seal lip 111A abuts on an outer peripheral surface of the shaft 101 in an biased state, thus the sealing performance between the outer peripheral surface of the shaft 101 and the inner seal 111 is secured.

(1-4) Operation of Bearing Seal 110

Figure 4:
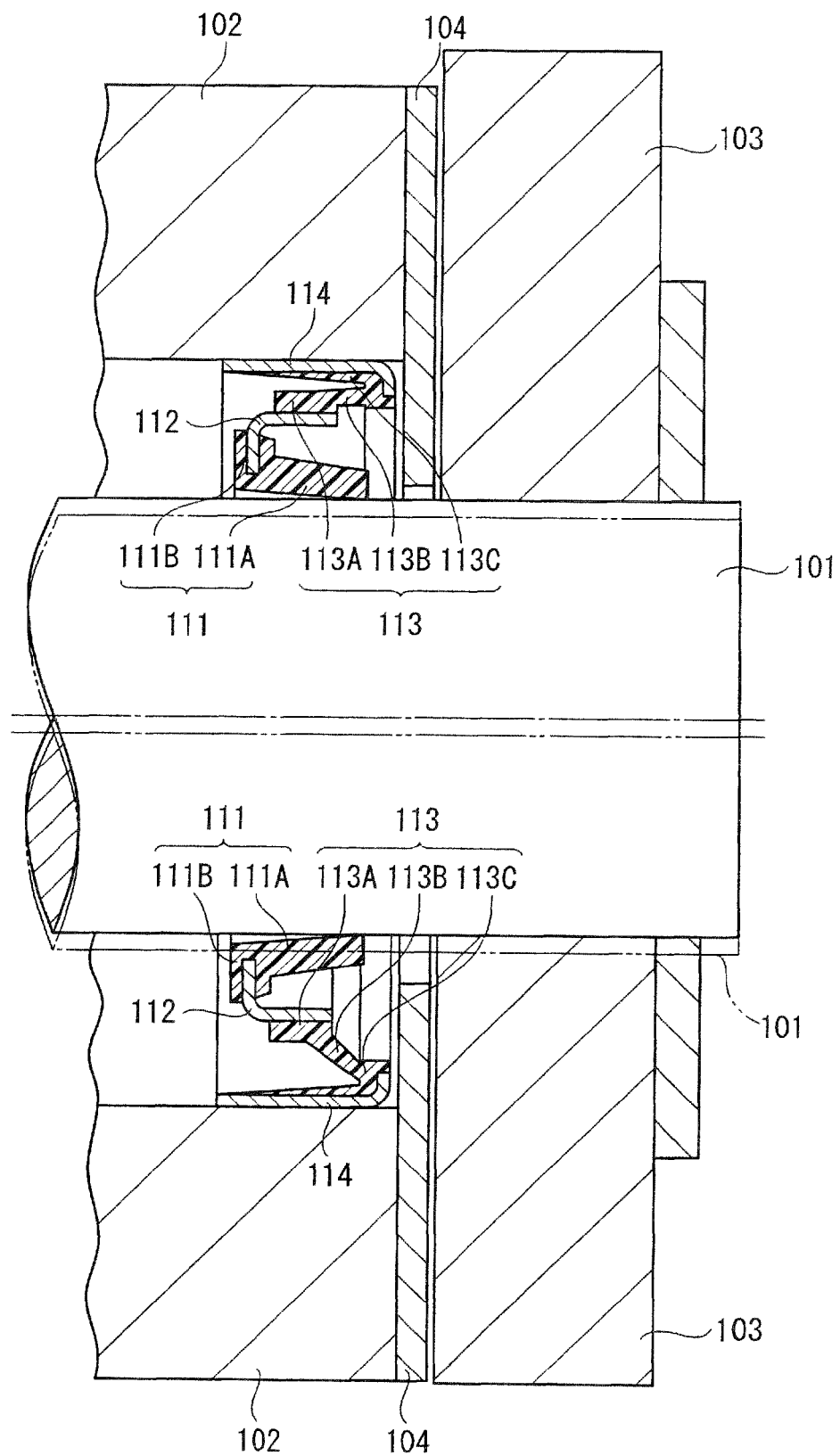
FIG. 4 is a cross section for explaining the function of the bearing seal in the aforesaid embodiment.

As shown in FIG. 4, the bearing seal 110 incorporated in the swing device 100 acts on the displacement of the shaft 101 relative to the boss 102 in the radial direction in a manner as described below.

First, when great force is exerted to the arm to which the shaft 101 is mounted, the shaft 101 will be displaced along its radial direction orthogonal to its central axis from the neutral position as indicated by the two-dot chain line toward the position drawn by a real line.

Since the deformation of the inner seal 111 of the bearing seal 110 in the radial direction is suppressed by the inner ring 112, the inner seal 111 will be displaced together with the shaft 101 in the radial direction with no change in the abutting state between the seal lip 111A and the shaft 101 and in the biasing force.

In order to allow the outer seal 113 provided outside the inner ring 112 to absorb the displacement of the shaft 101, the extending/contracting portion 113B is displaced to absorb the displacement of the shaft 101. Specifically, in the upper portion of the FIG. 4, the extending/contracting portion 113B is deformed so as to fall toward the horizontal direction, so that the gap in the inner portion of the C-shaped cross section of the outer seal 113 is collapsed.

On the other hand, in the lower portion of the FIG. 4, the extending/contracting portion 113B is deformed so as to be raised toward the vertical direction thus the gap in the inner portion of the C-shaped cross section of the outer seal 113 becomes large, so that the displacement of the shaft 101 against the boss 102 is absorbed due to the deformation of the outer seal 113, and the abutting state between inner seal 111 and the shaft 101 is maintained by the inner ring 112.

On the other hand, in the case where the boss 102 is sealed with lubricant oil such as grease thereinside, though the bearing seal 110 tends to move outward in the axial direction of the shaft 101 due to the pressure of the lubricant oil, the movement is restricted by the outer ring 114. Further, such movement of the bearing seal 110 in the same direction is also restricted by the shim 104 as a stopper member. Incidentally, the outer seal 113 can also be attached to the boss directly without employing the outer ring 114.

(1-5) Advantage of First Embodiment

The first embodiment has the following advantages.

(a) Owing to the inner ring 112 as a ring-shaped rigid portion, the inner ring 112 itself can be prevented from being deformed in the radial direction, and the abutting state can be maintained with no change in biasing force of the inner seal 111, therefore seal surface pressure can be generated by only the inner seal 111. Consequently, it is possible to bring the inner seal 111 into proper press-contact with the shaft 101, and therefore good sealing performance in normal condition can be maintained Incidentally, even when the shaft 101 and the boss 102 rotate against each other or slide against each other along the axial direction, a gap in the abutting portion between the shaft 101 and the inner seal 111 is prevented from being generated, therefore earth and the like are prevented from entering, the lubricant oil is prevented from leaking out through the gap, and the durability of the swing device 100 can be substantially improved.

(b) Since the inner seal 111 abuts on the outer peripheral surface of the shaft 101 with constant biasing force, in the case where the inner space of the boss 102, to which the bearing portion 105 is provided, is sealed with the grease or the like, the grease will leak out through the abutting portion when internal pressure rises, therefore whether or not the grease is properly injected can be confirmed by checking the leakage.

(c) Since the inner ring 112 is separately formed from the inner seal 111 and the outer seal 113, the optimum material can be selected corresponding to the force acting on the swing device 100, thus an optimum configuration can be implemented for preventing the inner seal 111 from being deformed to maintain the abutting state.

(d) Since the outer seal 113 is made of the material easily deformable compared with the inner seal 111, the sealing performance can be maintained by allowing the outer seal 113 to deform without inhibiting the sealing performance of the inner seal 111. Further, even when the displacement between the shaft 101 and the boss 102 is an abrupt one caused by impact vibration, since the outer seal 113 is followed up in quick responsiveness to the displacement, it is possible to provide a bearing seal 110 whose sealing performance do not deteriorate due to the impact.

(e) Since the spring constant of the inner seal 111 in the radial direction is substantially five times of that of the outer seal 113 in the same direction, the outer seal 113 is deformed corresponding to the displacement between the boss 102 and the shaft 101, therefore the sealing performance of the bearing seal 110 as a whole can be maintained. Particularly, by setting the spring constant of the inner seal 111 to no less than five times of that of the outer seal 113, even when the displacement speed is 2 m/s or higher, the outer seal 113 is deformed in quick responsiveness to the displacement of the shaft 101, therefore the sealing performance can be maintained.

(f) Since the outer seal 113 is made of elastic material, when the boss 102 and the shaft 101 rotate against each other, the outer seal 113 will not be caught in gap section, therefore the rotation of the swing device 100 can be properly secured.

(g) Since the deformation of the inner ring 112 is controlled to less than 5% when the bearing seal 110 is mounted to the shaft 101, even when displacement is generated between the shaft 101 and the boss 102, the inner seal 111 can be securely abutted to the shaft 101 with constant biasing force, thus the sealing performance of the inner seal 111 can be securely maintained.

(h) Since the seal lip 111A has a truncated cone shaped inner peripheral surface, when being mounted to the shaft 101, the seal lip 111A is abutted on the outer peripheral surface of the shaft 101 in the direction inclined to the axial direction, thus, with respect to the displacement between the shaft 101 and the boss 102 in the radial direction, the sealing performance can be maintained with proper biasing force. Further, since the abutting portion to the shaft 101 is small, the sliding performance of the shaft 101 is secured, so that the shaft 101 can be smoothly rotated.

(i) Since the outer ring 114 and the shim 104 are provided, even when the inner space of the boss 102 is sealed with lubricant oil, the bearing seal 110 will not move outward in the axial direction of the shaft 101 due to the internal pressure.

(2) Second Embodiment

Next, a second embodiment of the present invention will be described below. Incidentally, in the description of below, like components are denoted by like numerals as of those described above and will be explained in no more details. Further, in each of the cross sections for embodiments below, the right side is the outside of the swing device, and the left side is the inside of the swing device including the bearing portion.

In the aforementioned first embodiment, the outer seal 113 is constituted in such a manner that the extending/contracting portion 113B extends in the direction inclined to the inner ring fixing portion 113A and the outer ring fixing portion 113C, and the extending/contracting portion 113B changes the inclined state thereof to absorb the displacement of the shaft 101 relative to the boss 102.

Figure 5:
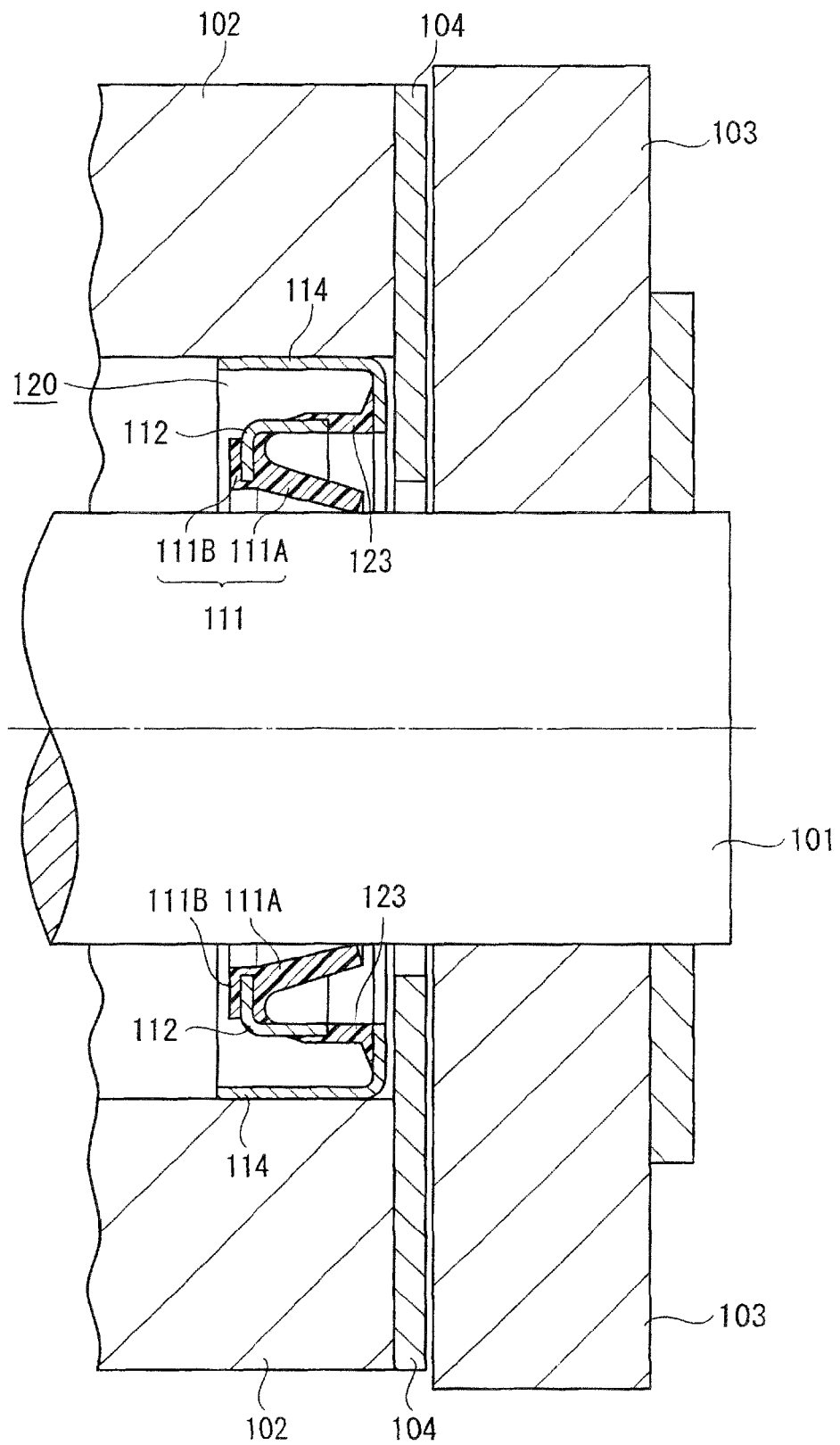
FIG. 5 is a cross section showing the structure of a bearing seal in a second embodiment of the present invention.

In contrast, as shown in FIG. 5, a bearing seal 120 of the second embodiment differs from that of the first embodiment in the point that an outer seal 123 has different arrangement.

That is, though the bearing seal 120 has the inner seal 111, the inner ring 112, and the outer ring 114 as in the case of the first embodiment, the bearing seal 120 is different from that of the first embodiment in the point that the outer seal 123, which connects the inner ring 112 and the outer ring 114, extends toward the extending direction of the L-shaped cross section of the inner ring 112 and is orthogonally connected to the inner surface of the L-sectioned outer ring 114, and in the state of being mounted to the shaft 101, the extending/contracting portion of the outer seal 123 extends along the axial direction of the shaft 101. Incidentally, the second embodiment is the same as the first embodiment in the material of the outer seal 123, and the fixing method of the outer seal 123 to the inner ring 112 and the outer ring 114.

The bearing seal 120 according to the second embodiment has the following advantage in addition to the advantages as described in the first embodiment.

Since the extending/contracting portion of the outer seal 123 extends along the axial direction of the shaft 101, the extending/contracting portion is advantageous in following the displacement of the bearing seal 120 in axial direction of the shaft 101.

(3) Third Embodiment

In the aforementioned first embodiment, the outer seal 113 of the bearing seal 110 has the inner ring fixing portion 113A, the extending/contracting portion 113B, and the outer seal 113, and the displacement of the shaft 101 is absorbed by the extending/contracting portion 113B inclined to the axial direction of the shaft 101.

Figure 6:
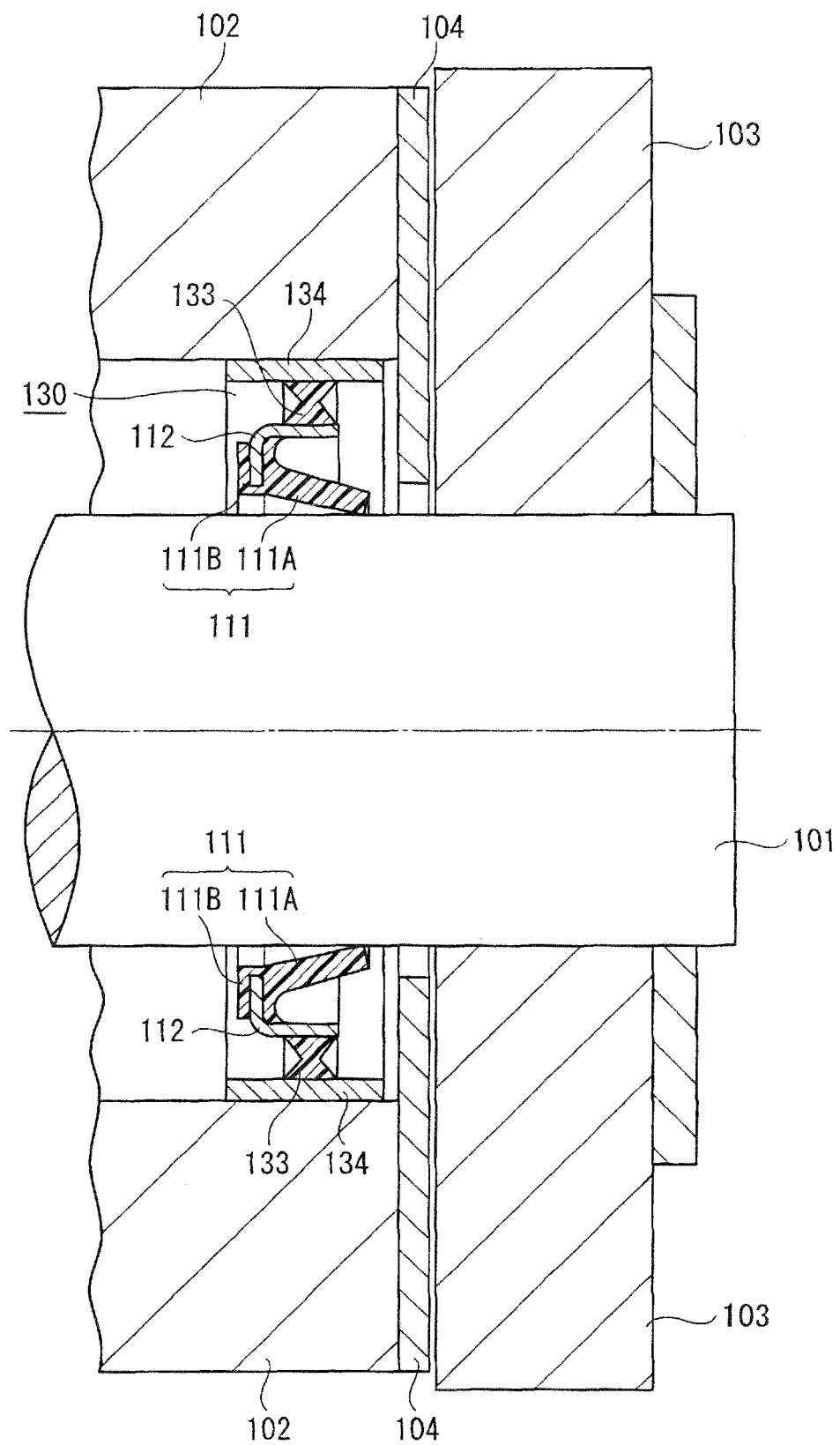
FIG. 6 is a cross section showing the structure of a bearing seal in a third embodiment of the present invention.

In contrast, as shown in FIG. 6, a bearing seal 130 of a third embodiment differs from that of the first embodiment in the point that an outer seal 133 extends along the direction perpendicular to the axial direction of the shaft 101. The outer seal 133 has a pinched cross sectional form where the central part is the narrowed, and the narrowed part extends/contracts.

Further, in the bearing seal 110 of the aforementioned first embodiment, the outer ring 114 has a substantially L-shaped cross section, while the bearing seal 130 of the third embodiment differs from that of the first embodiment in the point that an outer ring 134 is formed from a cylindrical body extends along the axial direction of the shaft 101 in the state of being mounted. Incidentally, since the outer ring 134 is formed from a simple cylindrical body, it needs to have large thickness dimension compared with the outer ring 114 of the bearing seal 110 of the first embodiment in order to secure the strength even when the same material is used.

The bearing seal 130 according to the third embodiment has the following advantage in addition to the advantages as described in the aforementioned embodiment.

Since the extending/contracting portion the outer seal 133 extends along the radial direction of the shaft 101 and has simple pinched cross sectional with the central part being narrowed, the outer seal 133 can get excellent moldability and improved productivity.

(4) Fourth Embodiment

In the aforementioned first embodiment, the outer seal 113 of the bearing seal 110 has the inner ring fixing portion 113A, the extending/contracting portion 113B, and the outer fixing portion 113C, and the displacement of the shaft 101 is absorbed by the extending/contracting portion 113B inclined to the axial direction of the shaft 101.

Figure 7:
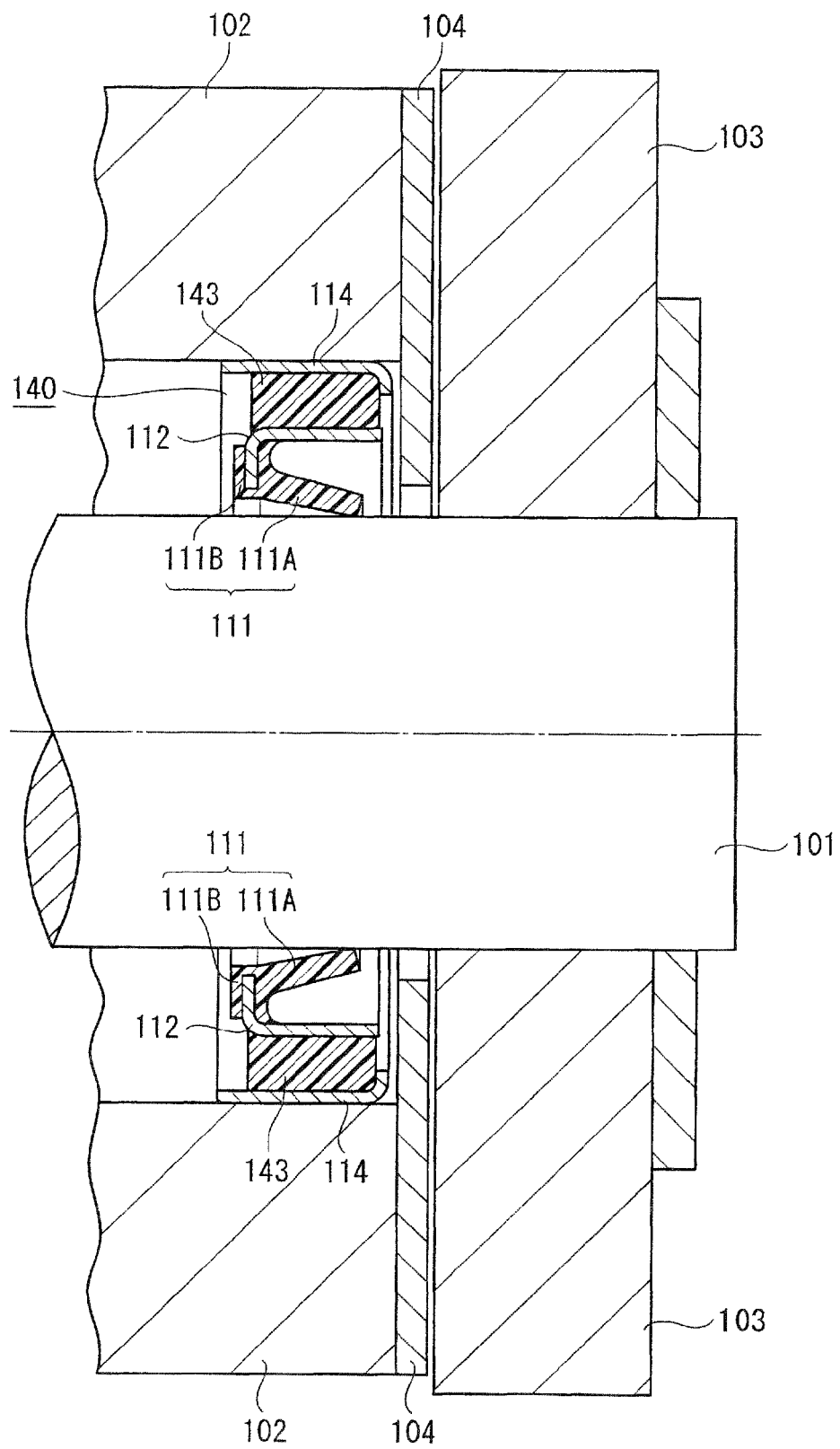
FIG. 7 is a cross section showing the structure of a bearing seal in a fourth embodiment of the present invention.

In contrast, as shown in FIG. 7, a bearing seal 140 of a fourth embodiment differs from that of the first embodiment in the point that an outer seal 143 is formed to have a simple rectangular cross section, and is adhered to the entire side surface of the L-shaped cross sections of the inner ring 112 and of the outer ring 114.

In such a case, it is preferred that the material for the outer seal 143 is a rubber having hardness lower than that of the material for the outer seal 113 of the bearing seal 110 of the first embodiment.

The bearing seal 140 according to the fourth embodiment has the following advantage in addition to the advantages as described in the aforementioned embodiment.

Since the outer seal 143 has extremely simple cross section, the moldability of the outer seal 143 can be further improved, and the productivity can be substantially improved.

(5) Fifth Embodiment

In the bearing seal 110 of the aforementioned first embodiment, the inner ring 112 as a ring-shaped rigid portion is formed between the inner seal 111 and the outer seal 113.

Figure 8:
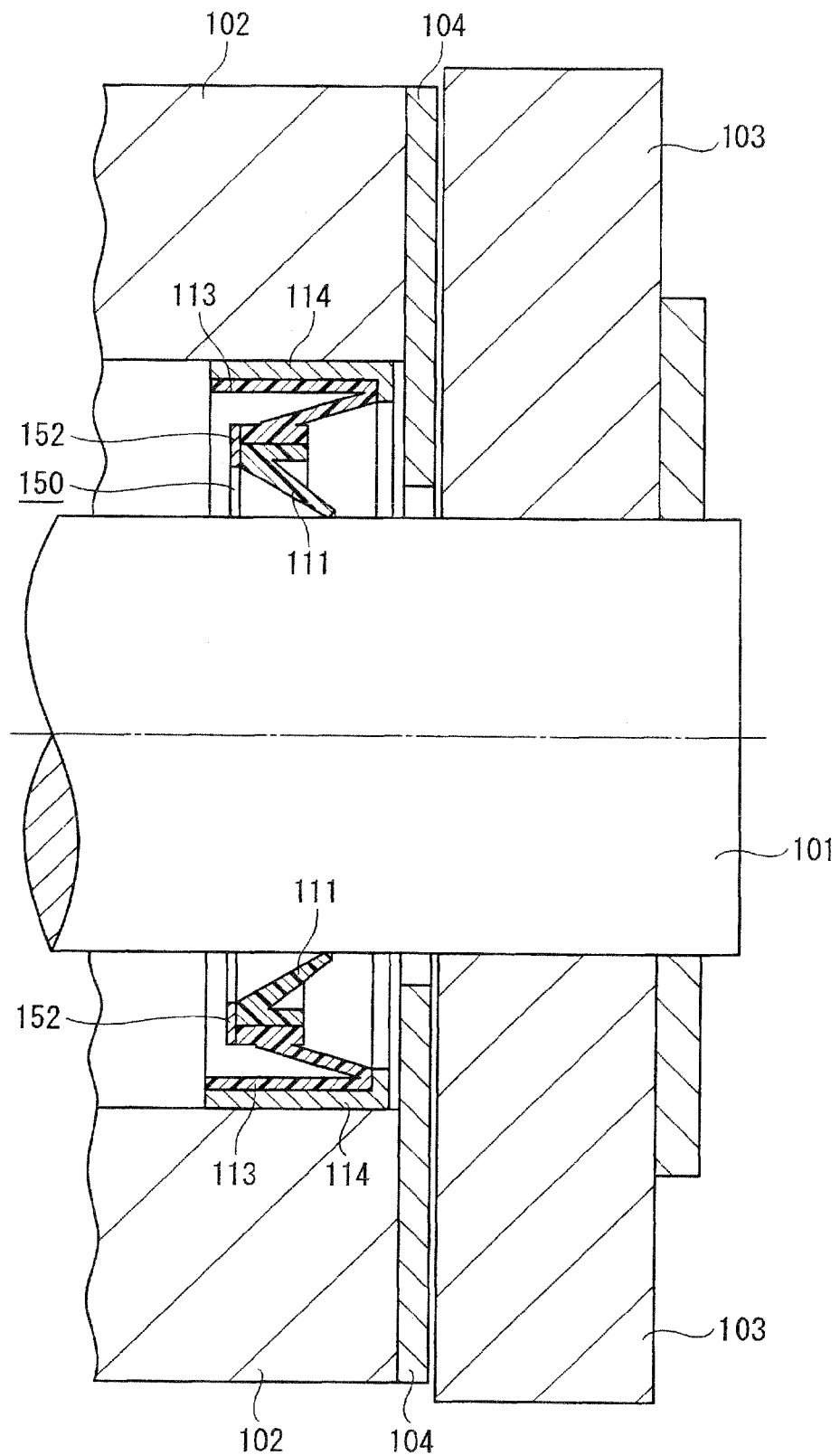
FIG. 8 is a cross section showing the structure of a bearing seal in a fifth embodiment of the present invention.

In contrast, as shown in FIG. 8, a bearing seal 150 of a fifth embodiment differs from that of the first embodiment in the point that an inner ring 152 as a ring-shaped rigid portion is formed in contact with the inner seal 111 and the outer seal 113.

That is, the inner ring 152 has a rectangular cross section extending along the direction perpendicular to the radial direction of the bearing seal 150, and is arranged to straddle the inner side surfaces of the inner seal 111 and the outer seal 113 so as to come into contact with both. Incidentally, the fifth embodiment is the same as the first embodiment in the material of the outer seal 113, and the fixing method of the outer seal 113 to the inner ring 152 and the outer ring 114.

The bearing seal 150 according to the fifth embodiment also has the same advantages as described in the aforementioned respective embodiments.

Further, the inner ring of the bearing seal can have various cross sections and can be arranged in various positions as shown in FIG. 9 to FIG. 12. Incidentally, in FIG. 9 to FIG. 12, only the bearing seal and the inner ring are indicated using numerals. The inner seal, the outer seal and the outer ring are identical to those of the aforementioned fifth embodiment, and therefore indications thereof will be omitted. Incidentally, the fixing method of the inner ring to the outer seal and the inner seal is identical to that of the first embodiment. Further, the outer seal and the inner seal can also be calked by the inner ring.

Figure 9:
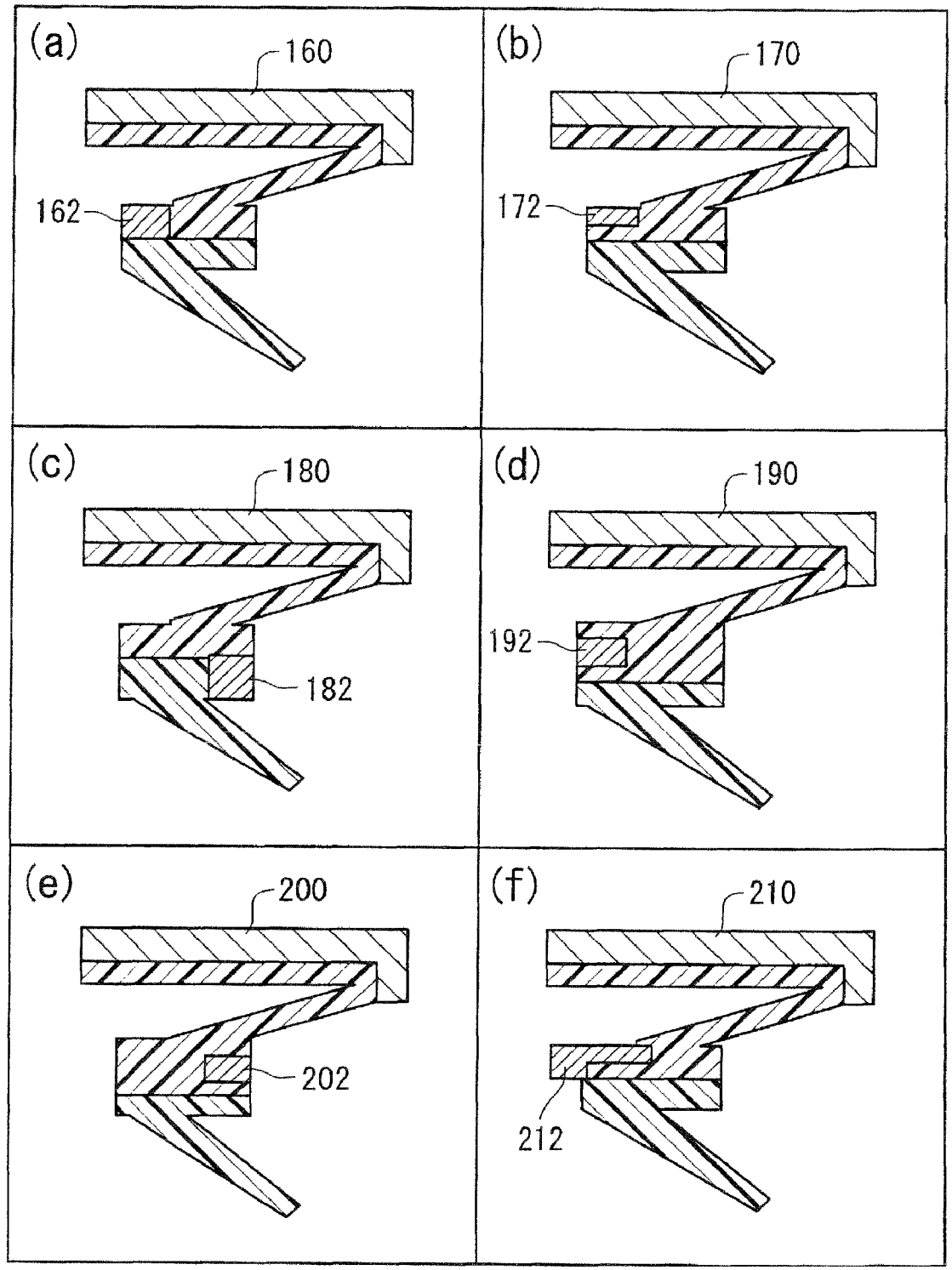
FIG. 9 is a set of schematic illustrations showing modifications of the bearing seal in the aforesaid embodiment.

As shown in FIG. 9, for example,
(a) In a bearing seal 160, an inner ring 162 is formed to have a rectangular cross section, of which a side contacts the outer seal, and a bottom contacts the inner seal.
(b) In a bearing seal 170, an inner ring 172 contacts the outer seal only. (c) In a bearing seal 180, an inner ring 182 is arranged outside the inner seal, and a bottom of the rectangular cross section contacts the outer seal.
(d) In a bearing seal 190, an inner ring 192 is arranged inside the outer seal and embedded into the outer seal.
(e) In a bearing seal 200, an inner ring 202 is arranged outside the outer seal and embedded into the outer seal.
(f) In a bearing seal 210, an inner ring 212 is arranged inside the outer seal and has a part of the L-shaped cross section thereof embedded into the outer seal.

Figure 10:
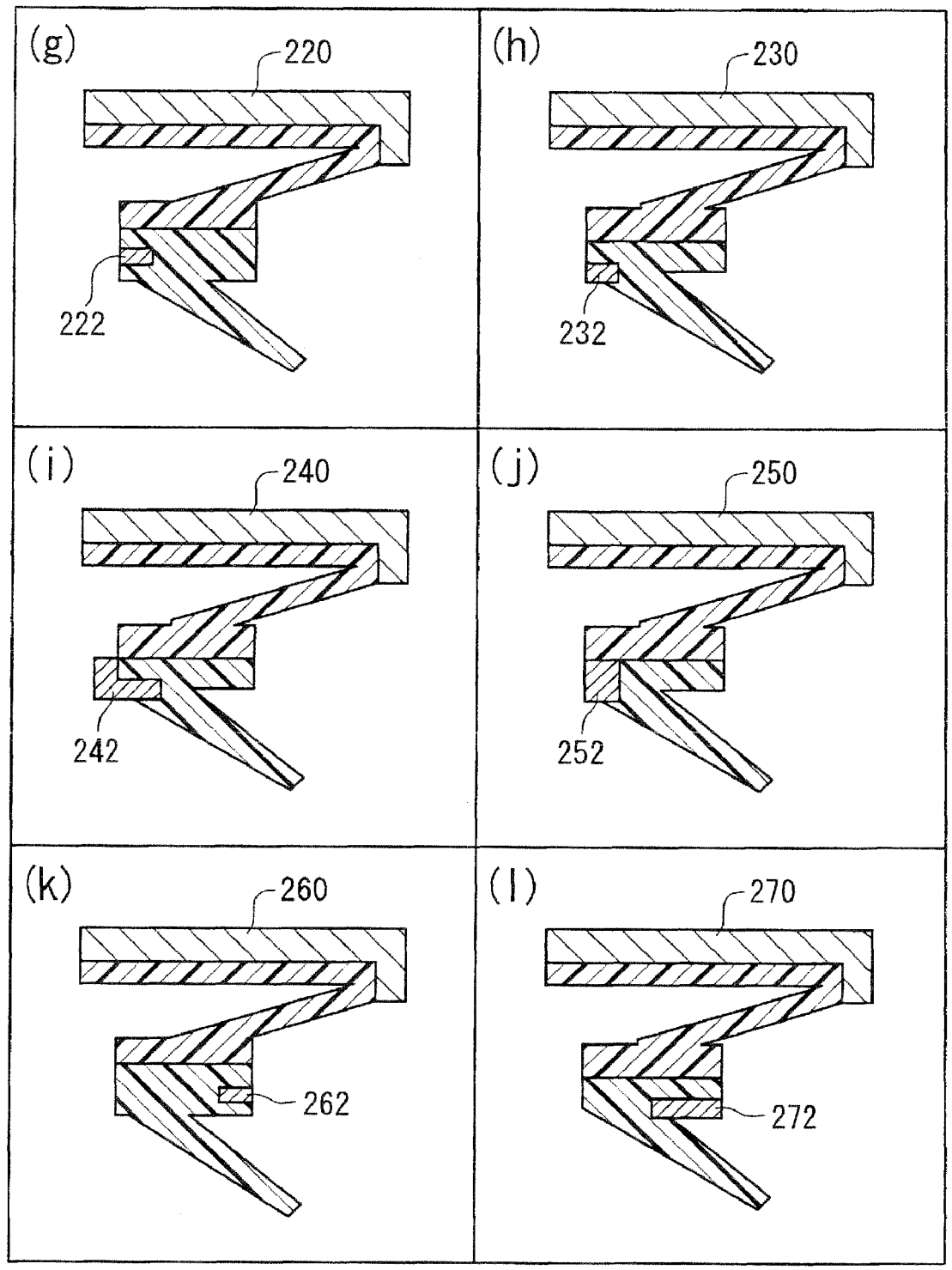
FIG. 10 is another set of schematic illustrations showing modifications of the bearing seal in the aforesaid embodiment.

Further, as shown in FIG. 10,
(g) In a bearing seal 220, an inner ring 222 is arranged inside the inner seal and embedded into the inner seal.
(h) In a bearing seal 230, an inner ring 232 is arranged inside the inner seal and embedded into the inner seal but with a side and a bottom thereof exposed to the outside.
(i) In a bearing seal 240, an inner ring 242 is arranged inside the inner seal and has a part of the L-shaped cross section thereof embedded into the inner seal.
(j) In a bearing seal 250, an inner ring 252 is arranged inside the inner seal, and has a part of the rectangular cross section thereof embedded into the inner seal and an upper side thereof been brought into contact with the outer seal.
(k) In a bearing seal 260, an inner ring 262 is arranged outside the inner seal and embedded into the inner seal.
(l) In a bearing seal 270, an inner ring 272 is arranged outside the inner seal and has a part of the rectangular cross section thereof embedded into the inner seal.

Figure 11:
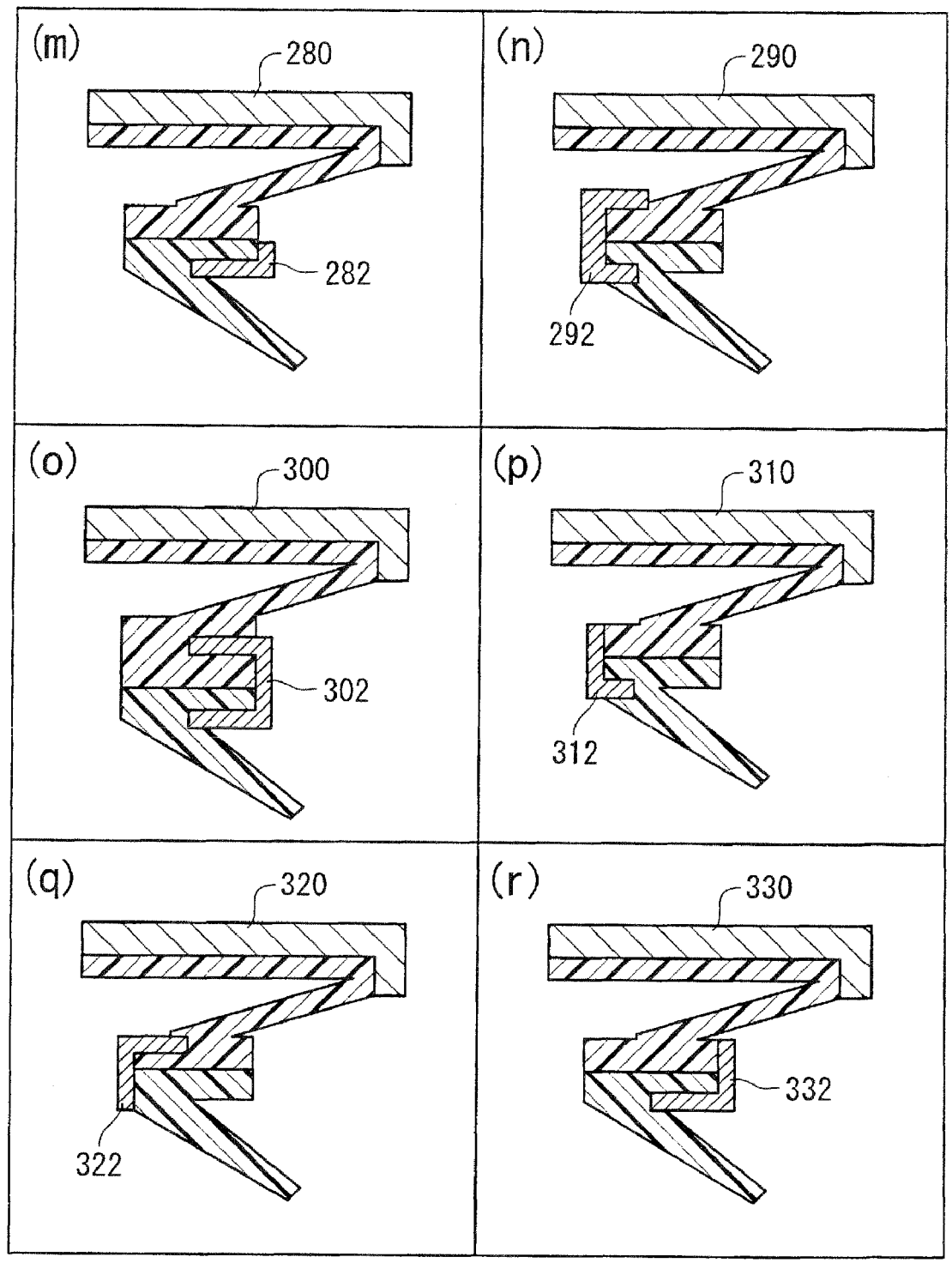
FIG. 11 is another set of schematic illustrations showing modifications of the bearing seal in the aforesaid embodiment.

Further, as shown in FIG. 11,
(m) In a bearing seal 280, an inner ring 282 is arranged outside the inner seal and has a part of the L-shaped cross section thereof embedded into the inner seal.
(n) In a bearing seal 290, an inner ring 292 is arranged so as to straddle the insides of the inner seal and the outer seal with distal end portions of the C-shaped cross section thereof embedded into the inner seal and the outer seal respectively.
(o) In a bearing seal 300, an inner ring 302 is arranged so as to straddle the outsides of the inner seal and the outer seal with distal end portions of the C-shaped cross section thereof embedded into the inner seal and the outer seal respectively.
(p) In a bearing seal 310, an inner ring 312 is arranged so as to straddle the insides of the inner seal and the outer seal with a part of the L-shaped cross section thereof embedded into the inner seal.
(q) In a bearing seal 320, an inner ring 322 is arranged so as to straddle the insides of the inner seal and the outer seal with a part of the L-shaped cross section thereof embedded into the outer seal.
(r) In a bearing seal 330, an inner ring 332 is arranged so as to straddle the outsides of the inner seal and the outer seal with a part of the L-shaped cross section thereof embedded into the inner seal.

Figure 12:
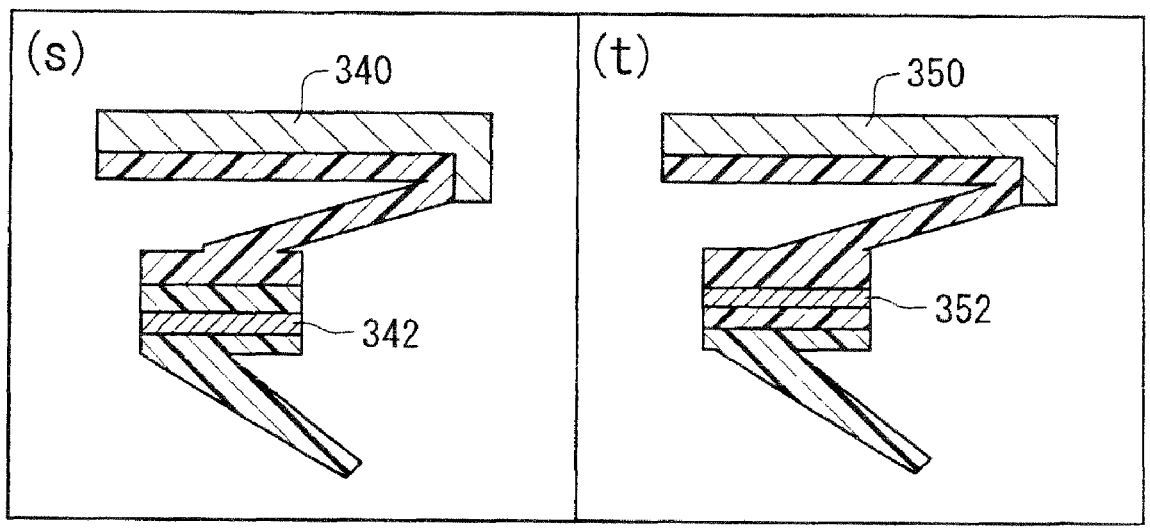
FIG. 12 is another set of schematic illustrations showing modifications of the bearing seal in the aforesaid embodiment.

Furthermore, as shown in FIG. 12, (s) In a bearing seal 340, an inner ring 342 has a cross section of which the length is substantially equal to that of the base of the inner seal, and the inner ring 342 is embedded into the inner seal.

(t) In a bearing seal 350, an inner ring 352 has a cross section of which the length is substantially equal to that of the base of the outer seal, and the inner ring 352 is embedded into the outer seal.

(6) Sixth Embodiment

In the bearing seal 110 of the aforementioned first embodiment, the inner ring 112 has an L-shaped cross section, and a part of the L-shaped cross section is embedded into the inner seal 111.

Figure 13:
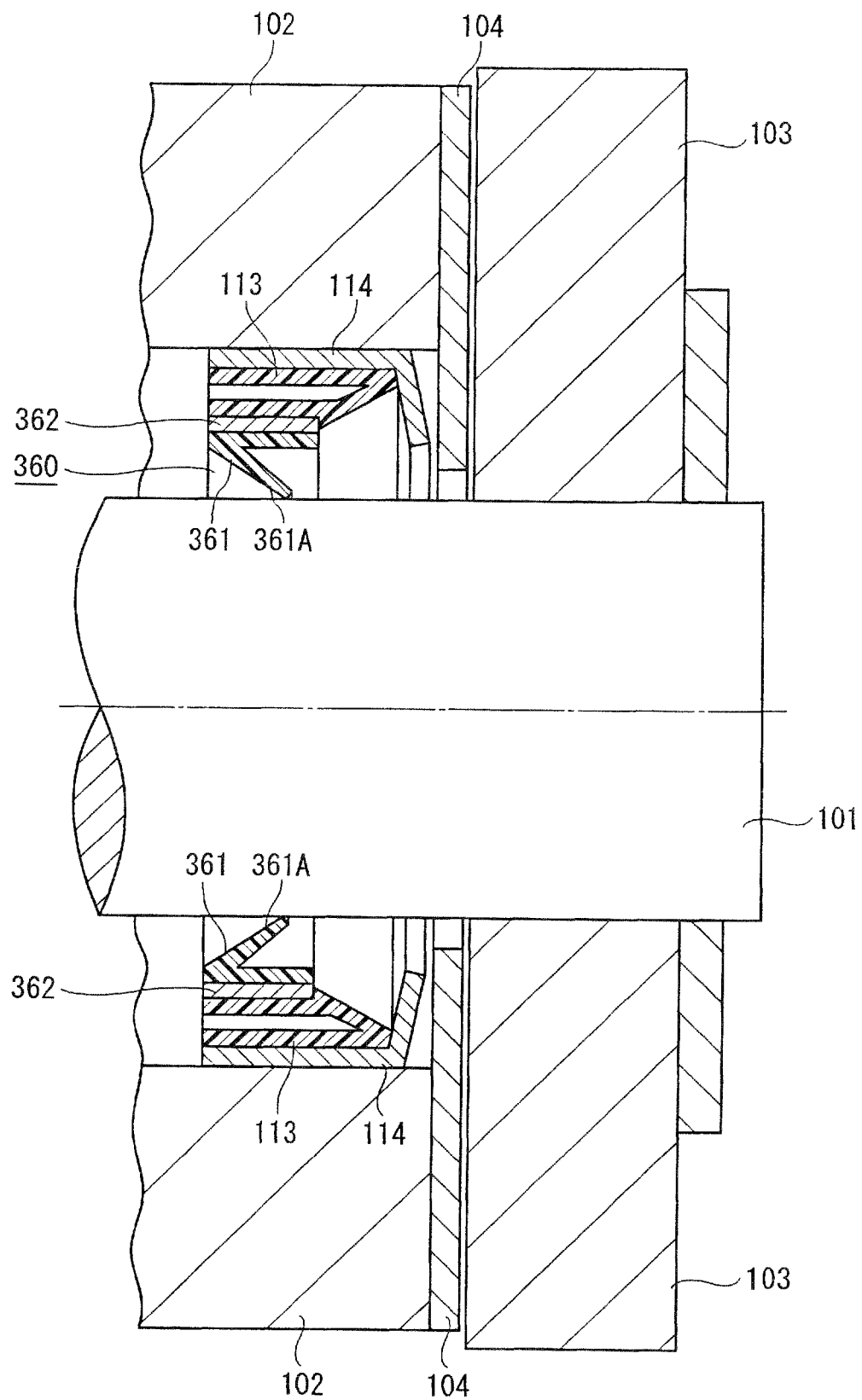
FIG. 13 is a cross section showing the structure of a bearing seal in a sixth embodiment of the present invention.

In contrast, in a bearing seal 360 of a sixth embodiment differs from that of the first embodiment in the point that, as shown in FIG. 13, an inner ring 362 as a ring-shaped rigid portion is formed from a cylindrical body having a rectangular cross section, the cylindrical body having the entire inner peripheral surface thereof formed as an adhesive face to an inner seal 361 and outer peripheral surface thereof formed as an adhesive face to the outer seal 113. In other words, the inner ring 362 is held between the inner seal 361 and the outer seal 113. Incidentally, the inner ring 362 is made of SPC steel or the like as in the case of the first embodiment.

The bearing seal 360 according to the sixth embodiment has the following advantage in addition to the advantages as described in the aforementioned embodiment.

Since the inner ring 362 can be formed from a simple cylindrical member, the manufacturing of the inner ring 362 can be simplified.

Further, since the entire inner and outer peripheral surfaces can be formed as adhesive faces to the inner seal 361 and the outer seal 113 respectively; and the mutually integrated structure has improved strength.

(7) Seventh Embodiment

In the aforementioned sixth embodiment, the inner ring 362 is arranged so as to be held between the inner seal 361 and the outer seal 113.

Figure 14:
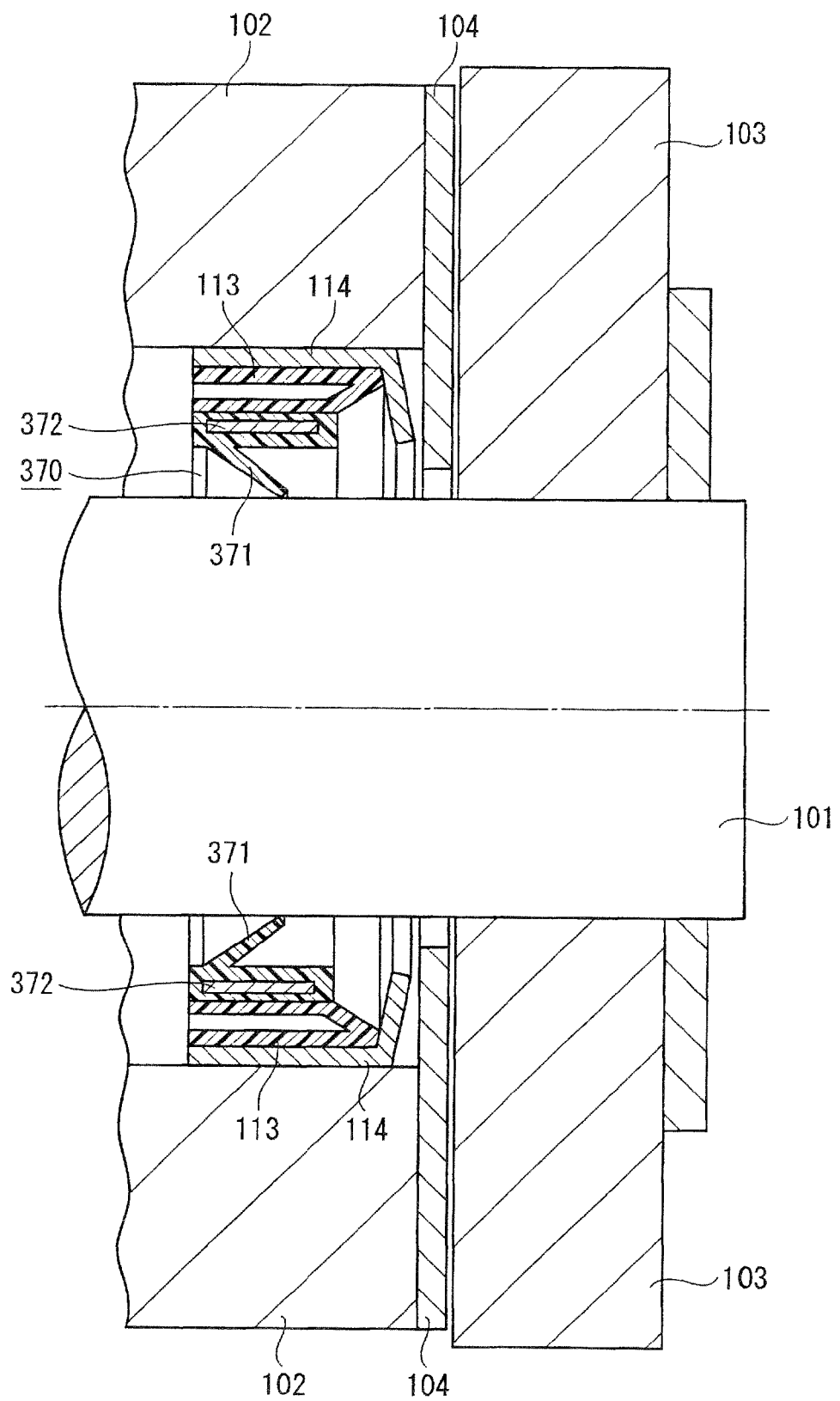
FIG. 14 is a cross section showing the structure of a bearing seal in a seventh embodiment of the present invention.

In contrast, as shown in FIG. 14, a bearing seal 370 of a seventh embodiment differs from that of the sixth embodiment in the point that an inner ring 372 as a ring-shaped rigid portion is embedded into a base of an inner seal 371 so as to be integrated with the inner seal 371. Also, the base of the inner seal 371 and the base of the outer seal 113 are adhered and fixed to each other.

The bearing seal 370 according to the seventh embodiment has the following advantage in addition to the advantages as described in the aforementioned embodiment.

Since the inner ring 372 is embedded into the inner seal 371 so as to be integrated with the inner seal 371, when the displacement of the shaft 101 relative to the boss 102 in the radial direction is generated, the effect of constraining the displacement of the inner seal 371 in the radial direction is further improved.

(8) Eighth Embodiment

In the aforementioned sixth embodiment, the inner ring 362 is arranged so as to be held between the inner seal 361 and the outer seal 113 and extends along the respective base.

Figure 15:
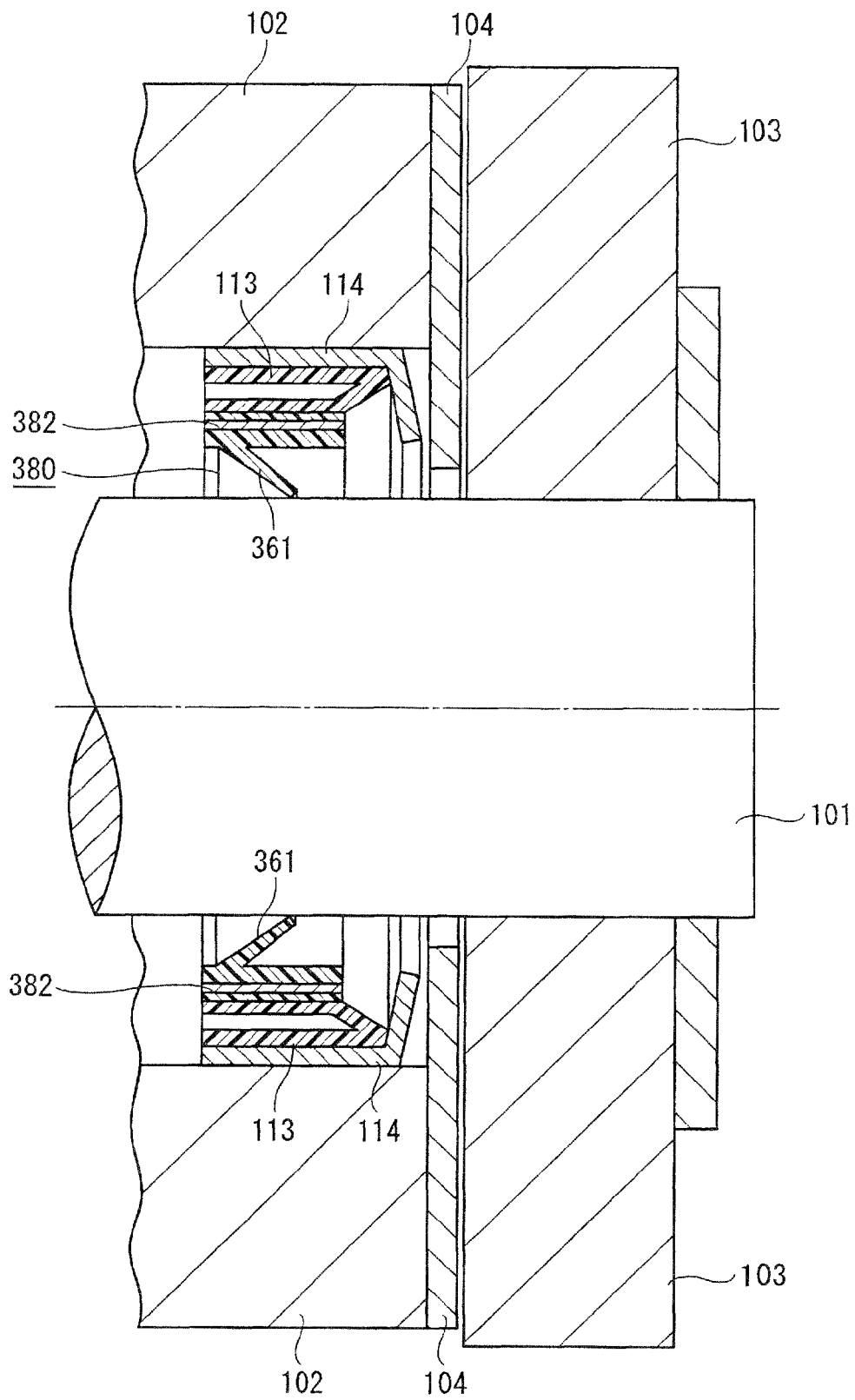
FIG. 15 is a cross section showing the structure of a bearing seal in an eighth embodiment of the present invention.

In contrast, a bearing seal 380 of an eighth arrangement differs from that of the sixth embodiment in the point that, as shown in FIG. 15, an inner ring 382 as a ring-shaped rigid portion is embedded into the inner seal 361, and the length of the cross section of the inner ring 382 along the axial direction of the shaft 101 is substantially equal to the length of the bases of the inner seal 361 and the outer seal 113 in the same direction.

The bearing seal 380 according to the eighth embodiment has the same advantages as described in the aforementioned embodiment.

(9) Ninth Embodiment

In the bearing seal 360 of the aforementioned sixth embodiment, the length of the cross section of the inner ring 362 along the axial direction of the shaft 101 is substantially equal to the length of the base of the inner seal 361.

Figure 16:
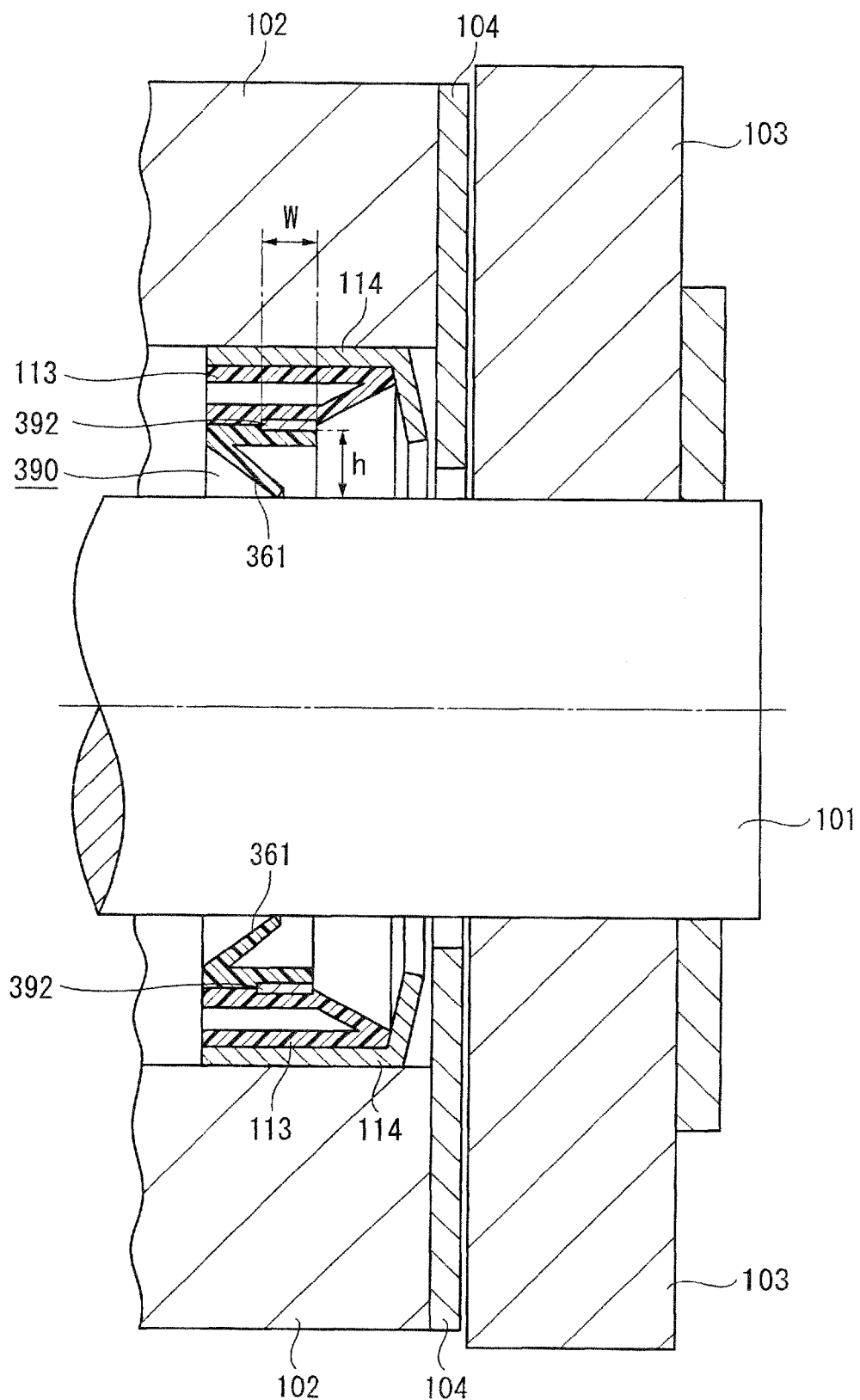
FIG. 16 is a cross section showing the structure of a bearing seal in a ninth embodiment of the present invention.

In contrast, as shown in FIG. 16, a bearing seal 390 of a ninth embodiment differs from that of the first embodiment in the point that an inner ring 392 as a ring-shaped rigid portion is arranged outside of the inner seal 361 in the axial direction of the shaft 101 on a boundary portion of the inner seal 361 and the outer seal 113. Incidentally, the dimension W of the cross section of the inner ring 392 along the axial direction of the shaft 101 is set to ½ or more of the dimension h of the inner seal 361 in the radial direction.

The bearing seal 390 according to the ninth embodiment has the following advantage in addition to the advantages as described in the aforementioned embodiment.

Since the dimension W of the cross section of the inner ring 392 along the axial direction of the shaft 101 is set to ½ or more of the dimension h of the inner seal 361 in the radial direction, even when the displacement speed of the shaft 101 in the radial direction becomes 2 m/s or more, the displacement of the shaft 101 can be well followed.

(10) Tenth Embodiment

In the aforementioned sixth embodiment, the inner ring 362, which constitutes the bearing seal 360, is formed separately from the inner seal 361 and the outer seal 113.

Figure 17:
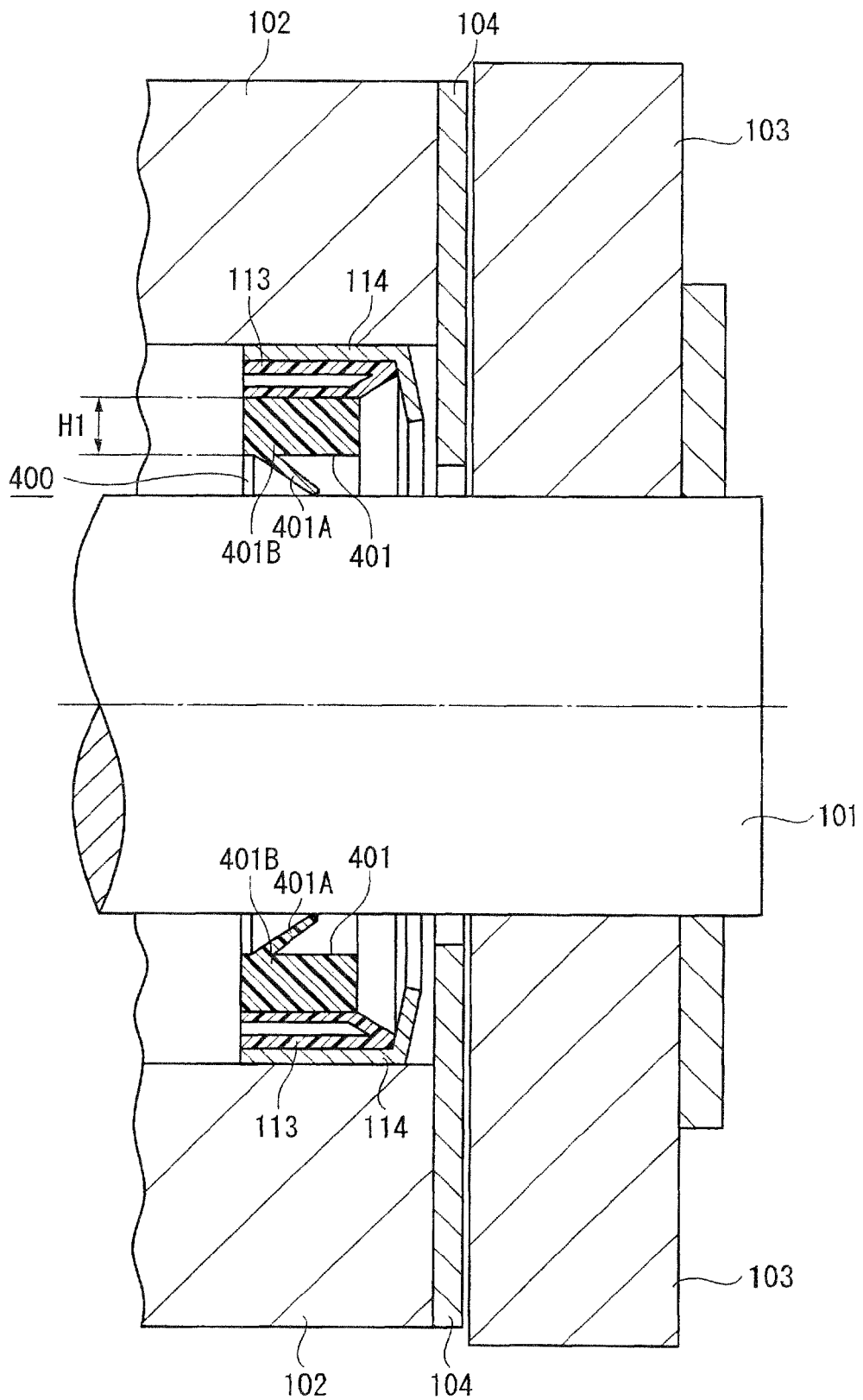
FIG. 17 is a cross section showing the structure of a bearing seal in a tenth embodiment of the present invention.

In contrast, as shown in FIG. 17, a bearing seal 400 of a tenth embodiment differs from that of the sixth embodiment in the point that the radial thickness H1 of a base 401B, which supports the proximal end side of a seal lip 401A of an inner seal 401, is set large enough so that the base 401B is strengthened therefore enabled to serve as a ring-shaped rigid portion.

The bearing seal 400 according to the tenth embodiment has the following advantage in addition to the advantages as described in the aforementioned embodiment.

Since a separate inner seal is not necessary to be used, the number of components for constituting the bearing seal 400 can be reduced, therefore the manufacturing can be facilitated, and the cost can be reduced.

(11) Eleventh Embodiment

In the bearing seal 400 of the aforementioned tenth embodiment, the radial thickness H1 of the base 401B, which constitutes the inner seal 401, is ensured so that the base 401B can serve as s a ring-shaped rigid portion.

Figure 18:
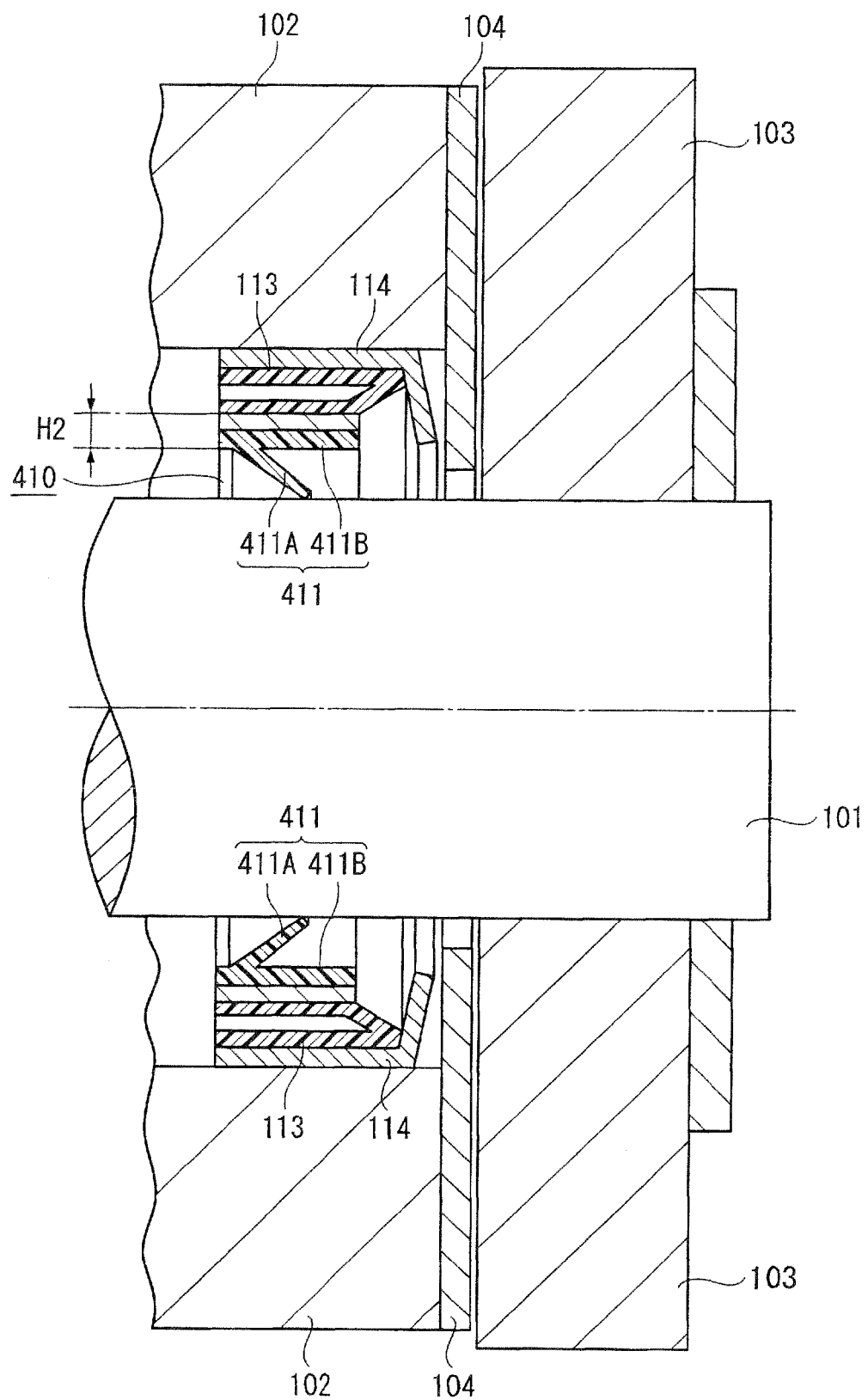
FIG. 18 is a cross section showing the structure of a bearing seal in an eleventh embodiment of the present invention.

In contrast, as shown in FIG. 18, a bearing seal 410 of an eleventh embodiment differs from that of the tenth embodiment in the point that the outer peripheral portion of a base 411B of an inner seal 411 is hardened so that the base 411B is strengthened and therefore enabled to serve as a ring-shaped rigid portion.

In other words, the inner seal 411 is the same as that of the other embodiments in the point that it has a seal lip 411A, but different in the point that the outer peripheral portion of the base 411B is hardened by heat treatment or the like so that the base 411B obtains high strength. For this reason, the thickness H2 of the base 411B is small compared to that of the tenth embodiment. Incidentally, the thickness H2 should be so set that the seal lip 411A will not be hardened when performing the hardening treatment, otherwise the sealing performance of the inner seal 411 can be reduced.

The bearing seal 410 according to the eleventh embodiment has the following advantage in addition to the advantages as described in the aforementioned embodiment: since the thickness of the inner seal 411 can be reduced, the bearing seal 410 can be prevented from being made large more than necessary.

(12) Twelfth Embodiment

In the bearing seal 400 of the aforementioned tenth embodiment, the thickness H1 of the base 401B of the inner seal 401 is set large so that the base 401B is enabled to serve as a ring-shaped rigid.

Figure 19:
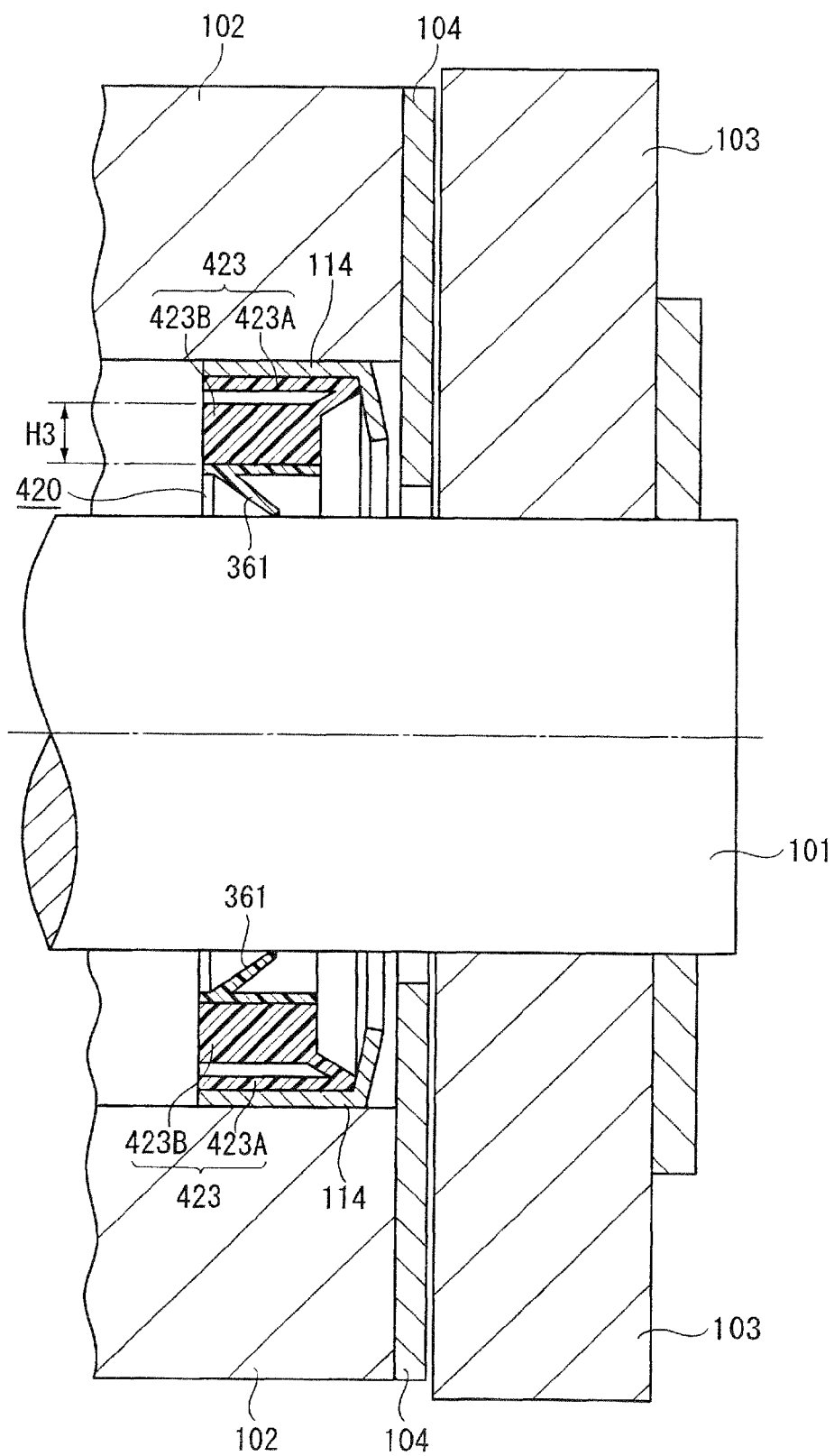
FIG. 19 is a cross section showing the structure of a bearing seal in a twelfth embodiment of the present invention.

In contrast, as shown in FIG. 19, a bearing seal 420 of a twelfth embodiment differs from that of the tenth embodiment in the point that the thickness H3 of a base 423B of an outer seal 423, is set large so that the base 423B is enabled to function as a ring-shaped rigid portion. Incidentally, since the outer seal 423 is made of elastic material having small spring constant compared to that of the inner seal 361, the thickness H3 of the base 423B is set large compared to the thickness H1 of the base 401B of the inner seal 401 of the tenth embodiment. Further, other portions such as the adhesive portion 423A to the outer ring 114, the extending/contracting portion and the like are the same as those of the other embodiments.

The bearing seal 420 according to the twelfth embodiment has the same advantages as described in the aforementioned embodiment.

(13) Thirteenth Embodiment

In the bearing seal 420 of the aforementioned twelfth embodiment, the thickness H3 of the base 423B of the outer seal 423 is set large so that the base 423B is enabled to serve as a ring-shaped rigid.

Figure 20:
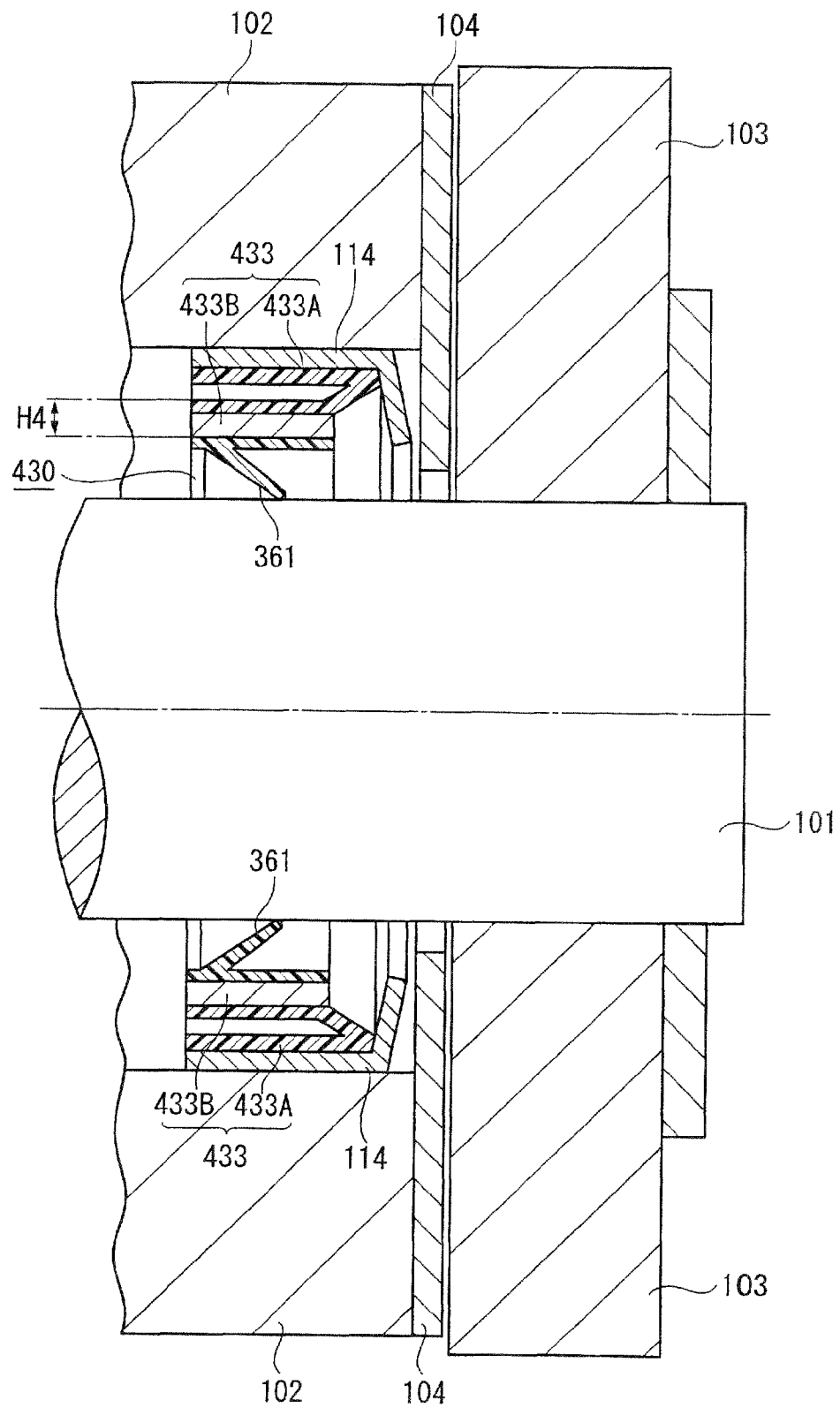
FIG. 20 is a cross section showing the structure of a bearing seal in a thirteenth embodiment of the present invention.

In contrast, as shown in FIG. 20, a bearing seal 430 of a thirteenth embodiment differs from that of the twelfth embodiment in the point that the inner peripheral portion of a base 433B of an outer seal 433 is hardened so that the base 433B is strengthened and therefore enabled to serve as s a ring-shaped rigid portion. Incidentally, the method of hardening the inner peripheral portion of the outer seal 433 is the same as in the eleventh embodiment, and by performing such a hardening treatment, the thickness H4 of the base 433B of the outer seal 433 is set small compared to that in the twelfth embodiment. Further, the adhesive portion 433A and the extending/contracting portion are the same as those of the twelfth embodiment.

The bearing seal 430 according to the thirteenth embodiment has the same advantages as described in the aforementioned embodiment.

(14) Fourteenth Embodiment

In the bearing seal 360 of the aforementioned sixth embodiment, the seal lip 361A of the inner seal 361 has a rectangular cross section and extends in the direction inclined to the axial direction of the shaft 101 to contact the outer peripheral surface of the shaft 101.

Figure 21:
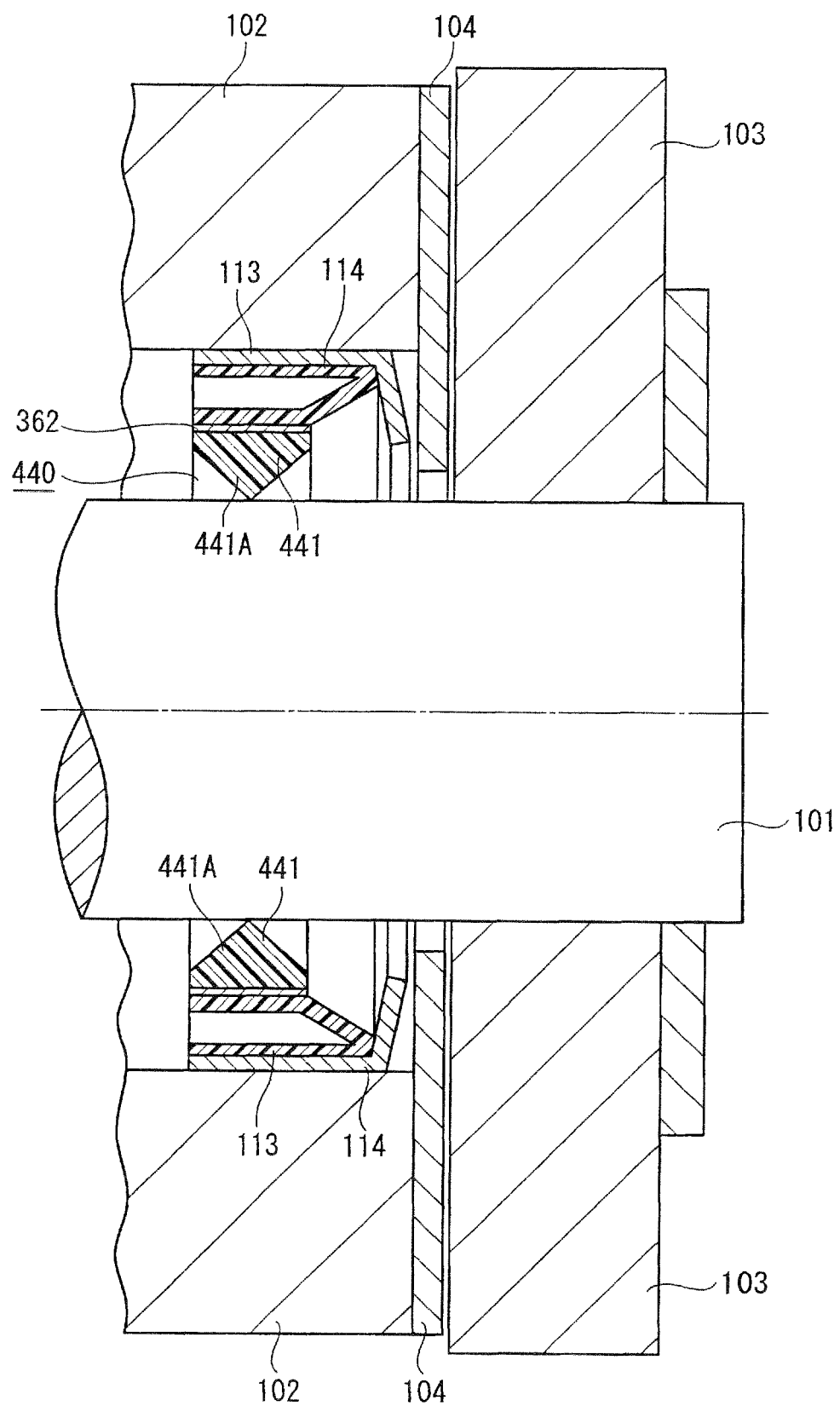
FIG. 21 is a cross section showing the structure of a bearing seal in a fourteenth embodiment of the present invention.

In contrast, as shown in FIG. 21, a bearing seal 440 of a fourteenth embodiment differs from that of the sixth embodiment in the point that an inner seal 441 has a seal lip 441A with a chevron shaped cross section, the width of which becomes gradually small toward the distal end side thereof facing the outer peripheral surface of the shaft 101.

In other words, the inner seal 441 has the seal lip 441A with a substantially triangular cross section, the width of which becomes gradually small from the proximal end portion on the side of the inner ring 362 toward the outer peripheral surface of the shaft 101, and the distal end portion contacts the outer peripheral surface of the shaft 101. Incidentally, the length of the proximal end portion of the inner seal 441 in the axial direction of the shaft 101 is substantially equal to the length of the inner ring 362 along the same direction.

The bearing seal 440 according to the fourteenth embodiment has the same advantages as described in the aforementioned embodiment.

(15) Fifteenth Embodiment

In the bearing seal 440 of the aforementioned fourteenth embodiment, only one outer ring 114 is provided outside the outer seal 113.

Figure 22:
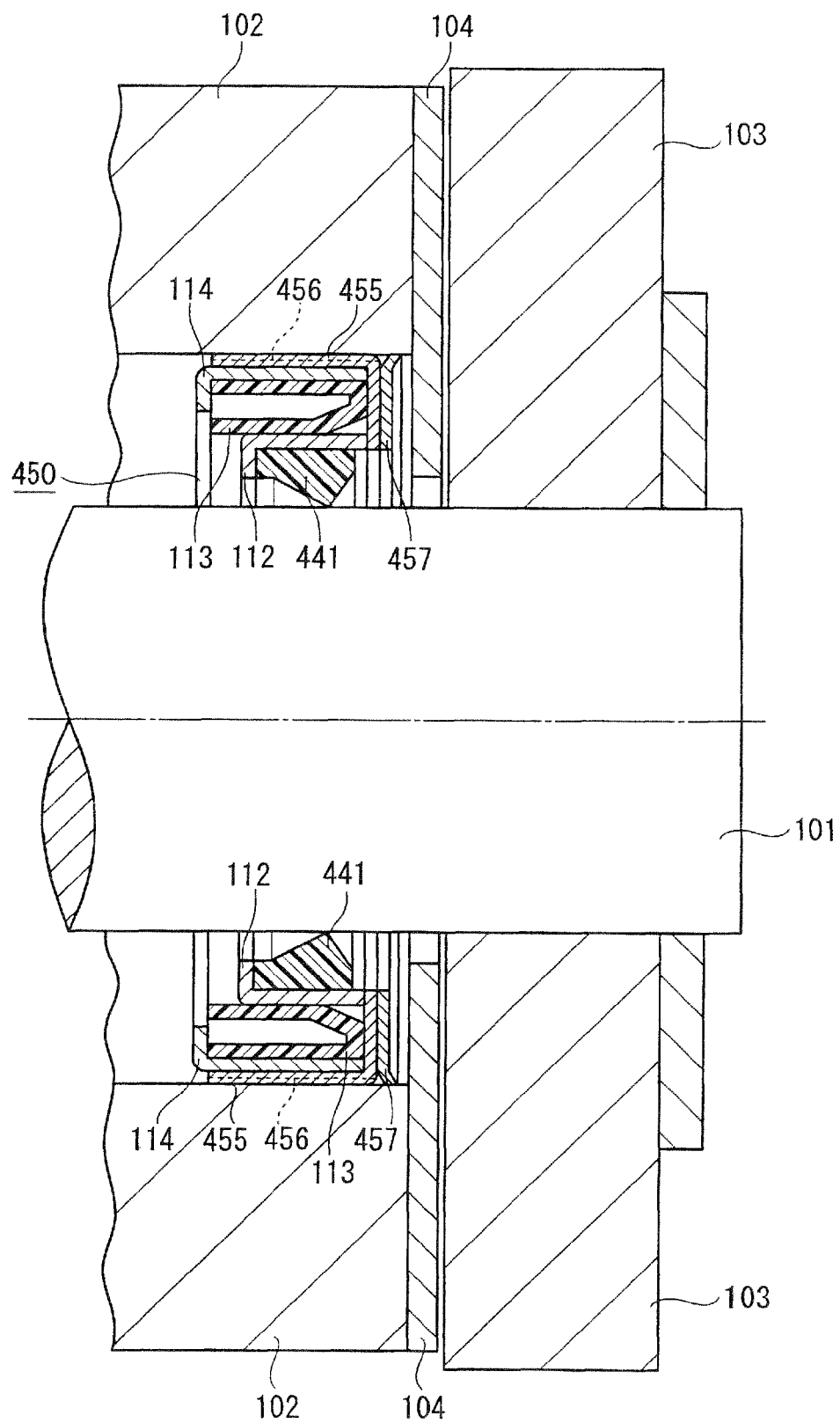
FIG. 22 is a cross section showing the structure of a bearing seal in a fifteenth embodiment of the present invention.

In contrast, as shown in FIG. 22, a bearing seal 450 of a fifteenth embodiment differs from that of the fourteenth embodiment in the point that a metal ring 455 is further provided outside the outer ring 114.

The metal ring 455 has a L-shaped cross section, on which and is a plurality of cutout grooves 456, each extending along the axial direction of the shaft 101, are formed in the circumferential direction. The cutout groove 456 is the portion for, when being mounted to the shaft 101, allowing the injected lubricant oil such as grease to leak out so that the bearing seal 450 will not move outward in the axial direction of the shaft 101 due to the injection of the lubricant oil.

Further, on the outside the metal ring 455 in the axial direction of the shaft 101, a lip seal 457 made of synthetic resin is provided for covering the cutout grooves 456 so that the cutout grooves 456 are prevented from being exposed to the outside.

The bearing seal 450 according to the fifteenth embodiment has the same advantages as described in the aforementioned embodiment.

(16) Sixteenth Embodiment

Figure 27:
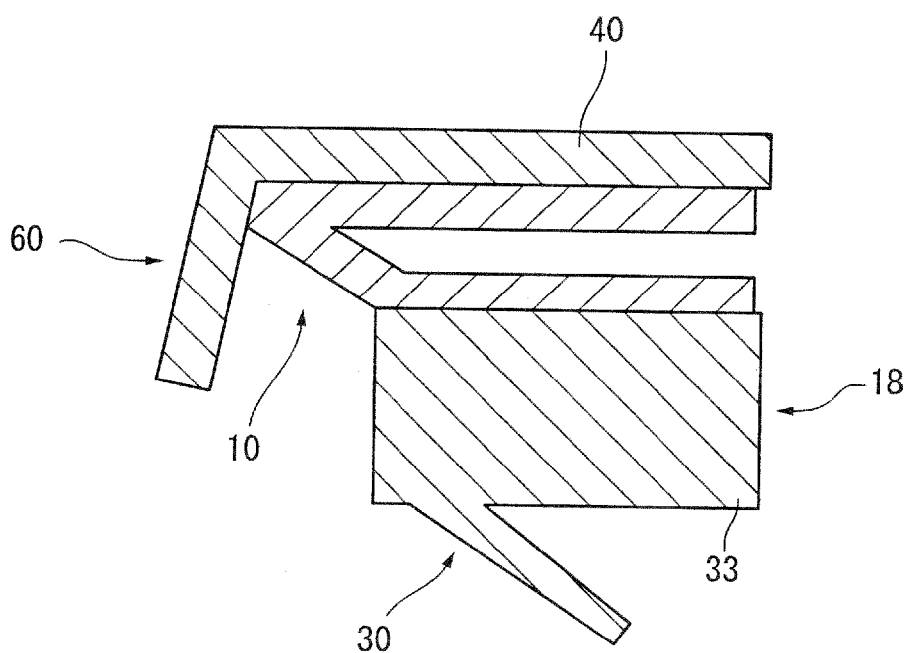
FIG. 27 is a cross section showing an example of forming a ring-shaped rigid portion in an inner seal (Example 2)
Figure 28:
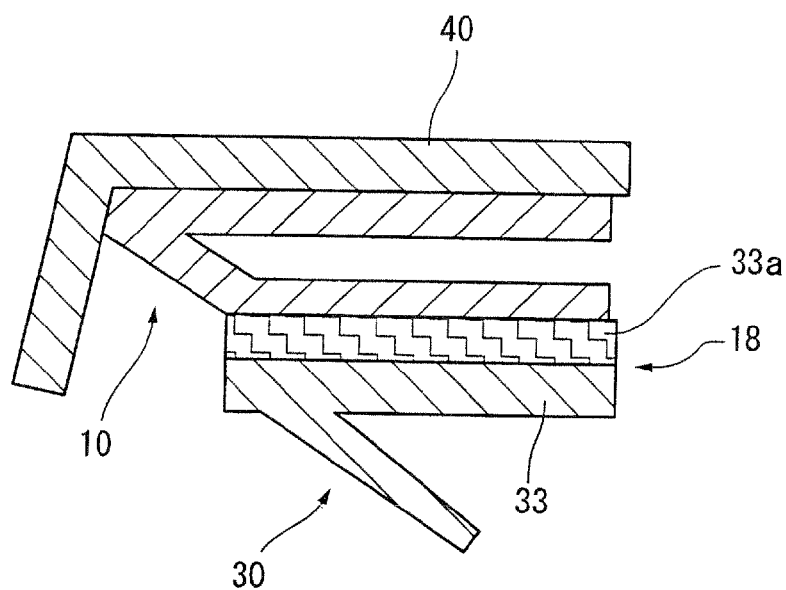
FIG. 28 is a cross section showing a modification of forming a ring-shaped rigid portion in an inner seal (Example 2)
Figure 29:
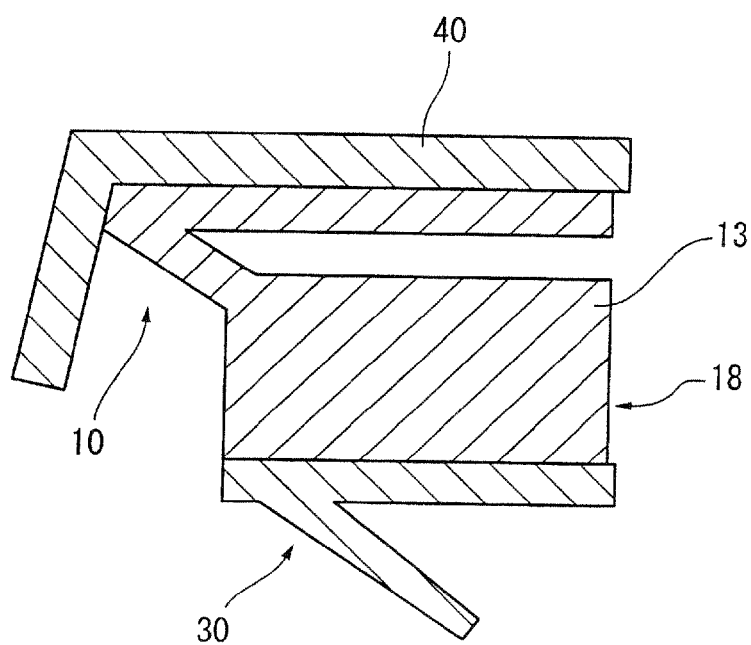
FIG. 29 is a cross section showing an example of forming a ring-shaped rigid portion in an outer seal (Example 3)
Figure 30:
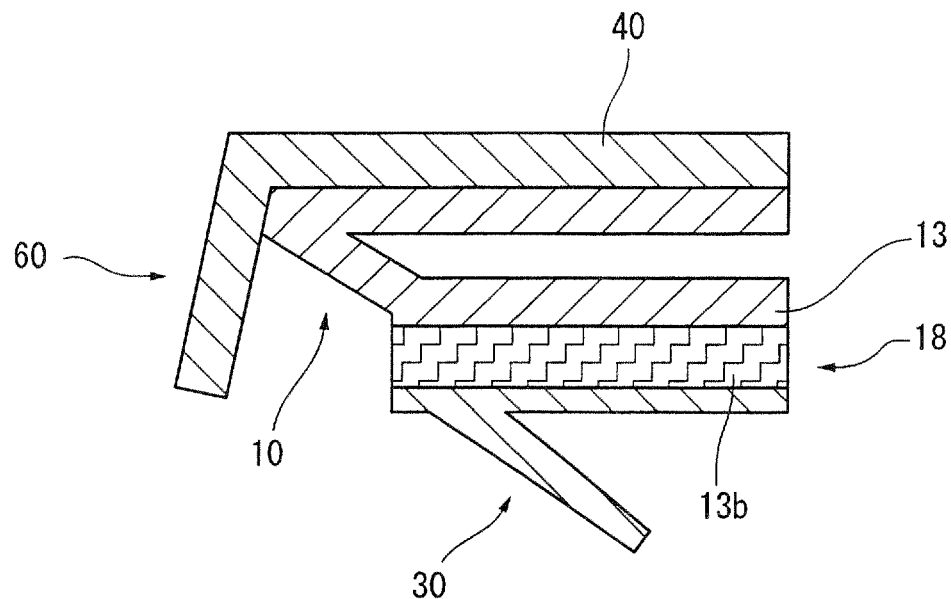
FIG. 30 is a cross section showing a modification of forming a ring-shaped rigid portion in an outer seal (Example 3)

A sixteenth embodiment of the present invention will be described below referring to the accompanying drawings. FIG. 23 to FIG. 26 are examples of the present invention, each being a partial cross section showing a bearing seal using an inner ring as a ring-shaped rigid portion. FIG. 27 and FIG. 28 are partial cross sections showing examples of forming a ring-shaped rigid portion in the abutting portion of the inner seal to the outer seal. FIG. 29 and FIG. 30 are partial cross sections showing examples of forming a ring-shaped rigid portion in abutting portion of the outer seal to the inner seal.

EXAMPLE 1

Figure 23:
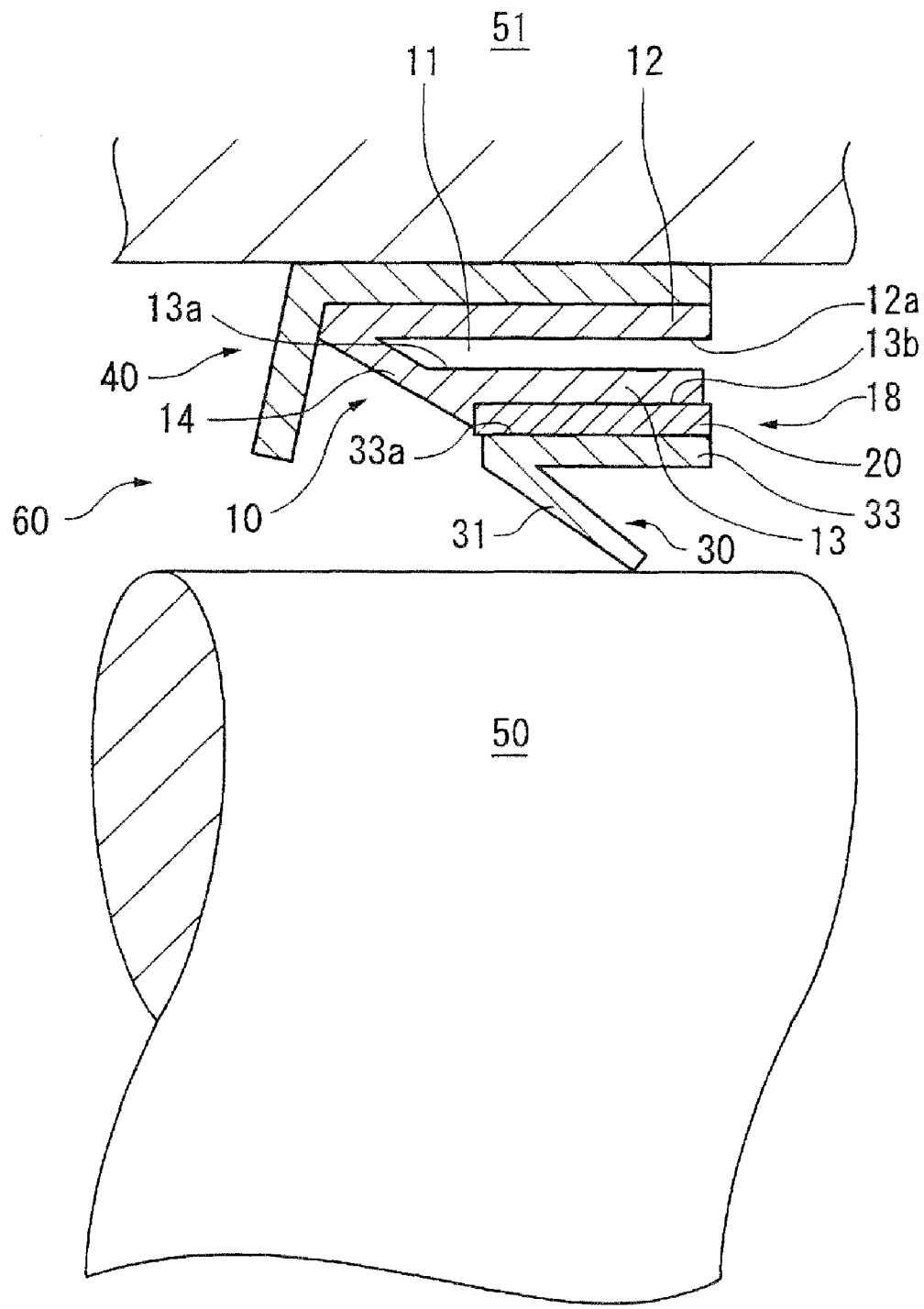
FIG. 23 is a cross section showing a bearing seal using an inner ring in a sixteenth embodiment of the present invention (Example 1)
Figure 32:
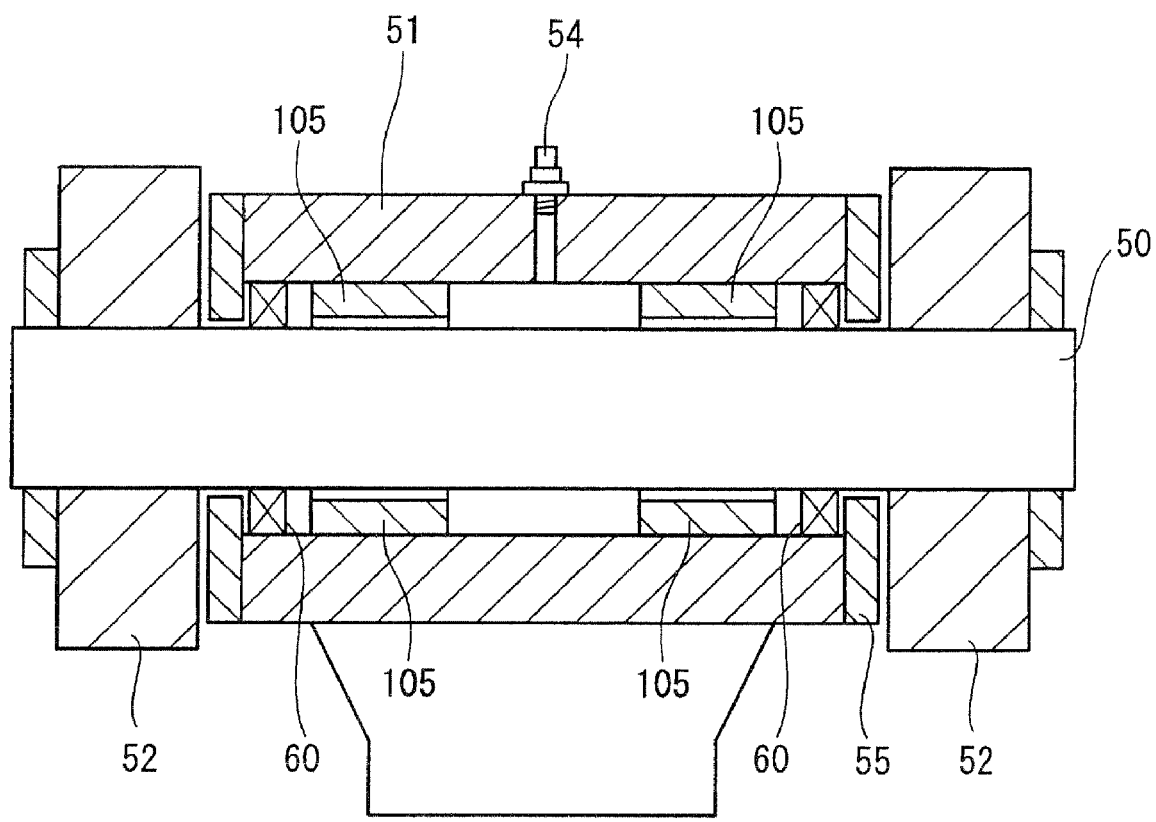
FIG. 32 is a cross section showing a using state of a bearing seal (Examples)

FIG. 23 shows an example in which an inner ring 20 as a ring-shaped rigid portion 18 is used; a bearing seal 60 is constituted by, from the outside toward the inside, an outer seal 10, the inner ring 20, an inner seal 30, and a metal ring 40; and the metal ring 40 is engaged with a boss 51. As shown in FIG. 32, the bearing seal 60 is circularly-arranged between a pin 50 and the boss 51. In order to explain the structure of the bearing seal 60, the partial cross section of the bearing seal 60 is indicated in the drawings including the bearing seal 60.

The outer seal 10 is easily deformable in the radial direction. The outer seal 10 may be made of soft material such as, for example, NBR with NBR hardness of 30°, and may preferably be provided with a clearance 11 substantially C-shaped in cross section.

Specifically, the structure includes an outer cylinder 12, an inner cylinder 13, and a connection piece 14 which connects the one end portion of the outer cylinder 12 in the width direction and one end portion of the inner cylinder 13 in the width direction; the inner surface 12a of the outer cylinder 12 and the outer surface 13a of the inner cylinder 13 are separated from each other; and the ring-shaped clearance 11 opens to the other end portion in the width direction.

The inner ring 20 used as the ring-shaped rigid portion 18 is required not to extend in the radial direction. The inner ring 20 may be made of material having small elongation, preferably made of material having elongation of 5% or less such as SPC steel, and may be annularly formed.

The inner seal 30 only includes a seal lip 31 having a crest which extends in the direction inclined to the outer peripheral surface of the pin 50 so that the distal end thereof contacts the outer peripheral surface of the pin 50. The inner seal 30 may be made of polymeric elastomer such as polyurethane with hardness of 95°.

The outer peripheral surface of the inner seal 30 is retained by the inner ring 20 as the ring-shaped rigid portion 18, and the pressure contact force of inner seal 30 to the pin 50 is constantly maintained by the ring-shaped rigid portion 18. In other words, the pressure contact force of the seal lip 31 of the inner seal 30 to the pin 50, namely the seal surface pressure, is generated by the inner seal 30 only, therefore good sealing performance in normal condition can be maintained.

Further, the restoring force of the outer seal 10 and the inner seal 30 corresponding to the constant displacement in the radial direction, namely the spring constant of the outer seal 10 and the inner seal 30, is so set that the spring constant of the inner seal 30 is larger than that of the outer seal 10.

Thus, the outer seal 10 can follow the displacement of the pin 50 in the radial direction and support the ring-shaped rigid portion 18 which is displaced together with the pin 50, and the displacement of the ring-shaped rigid portion 18 can be absorbed by the displacement of the outer seal 10 in the radial direction.

Thus, when the pin 50 is displaced relative to the boss 51 in the radial direction of the pin 50, the inner seal 30 and the inner ring 20 as the ring-shaped rigid portion 18 can be integrated with each other to be displaced following the displacement of the pin 50 in the radial direction; while when the pin 50 returns to the original position, the inner seal 30 and the inner ring 20 as the ring-shaped rigid portion 18 can be integrated with each other to return to the original position following the pin 50.

In other words, the good sealing performance can be maintained even in the moment when the pin 50 is being displaced in the radial direction It should be noted that the material and the shape of the outer seal 10, the inner ring 20 and the inner seal 30 are not limited to those as described above but can be varied as long as the objects of the present invention can be achieved.

Figure 24:
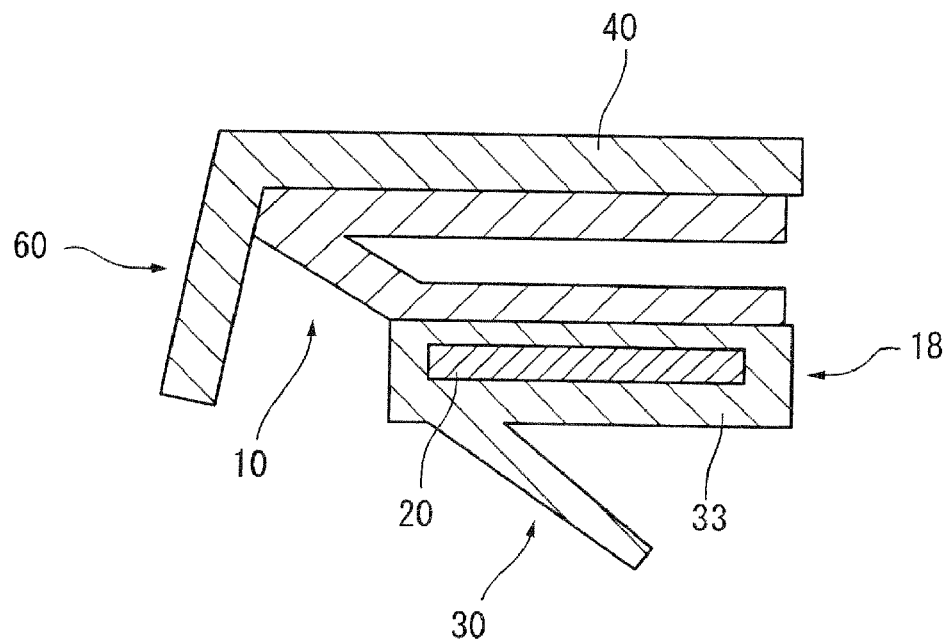
FIG. 24 is a cross section showing a modification of the bearing seal using an inner ring (Example 1)
Figure 25:
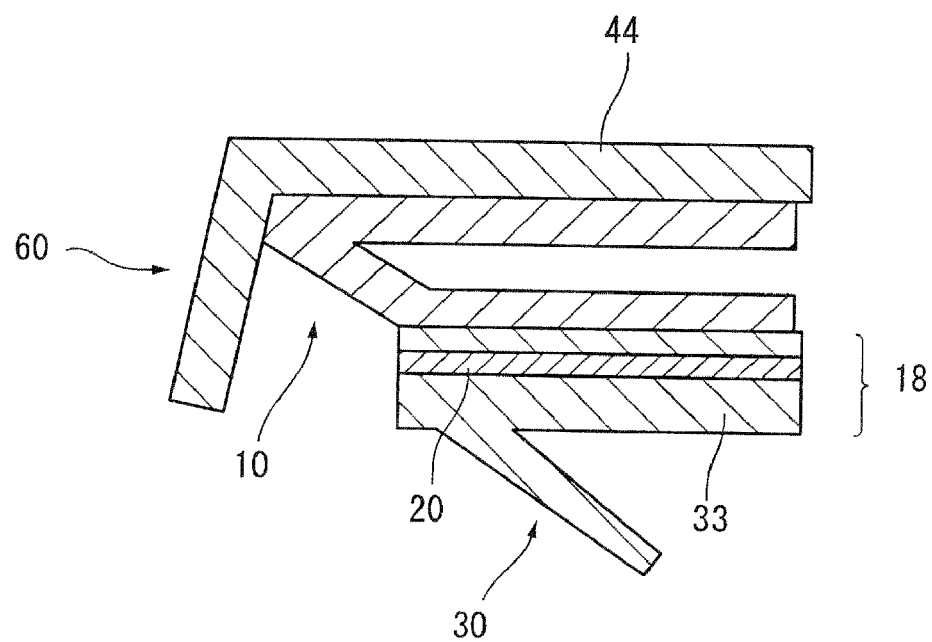
FIG. 25 is a cross section showing another modification of the bearing seal using an inner ring (Example 1)
Figure 26:
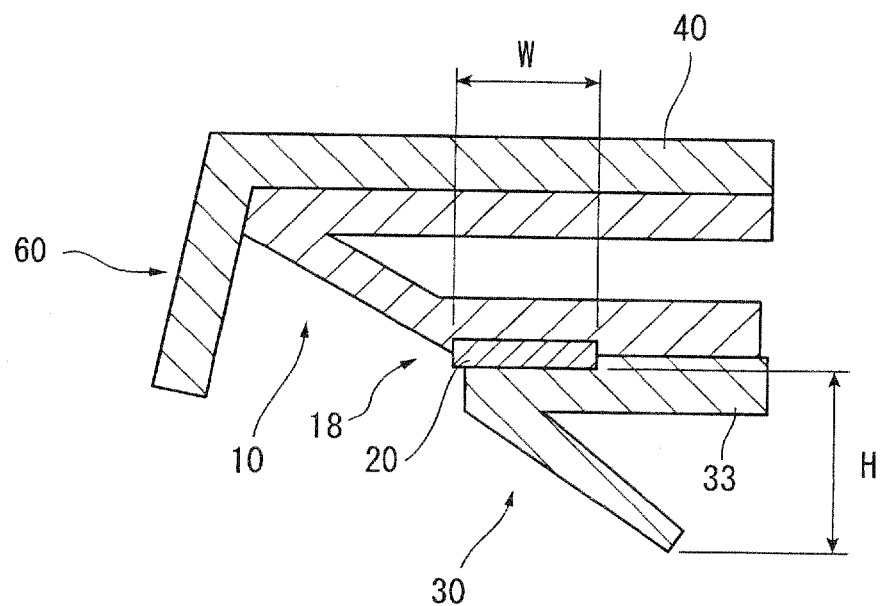
FIG. 26 is a cross section showing another modification of the bearing seal using an inner ring (Example 1)

FIG. 23 shows an example in which the inner ring 20 as the ring-shaped rigid portion 18 is arranged between the outer surface 33a of an outer cylinder 33 of the inner seal 30 and the inner surface 13b of the inner cylinder 13 of the outer seal 10. However, the inner ring 20 also can be arranged inside the outer cylinder 33 of the inner seal 30 as shown in FIG. 24, or be sandwiched by the outer cylinder 33 of the inner seal 30 as shown in FIG. 25.

Figure 41:
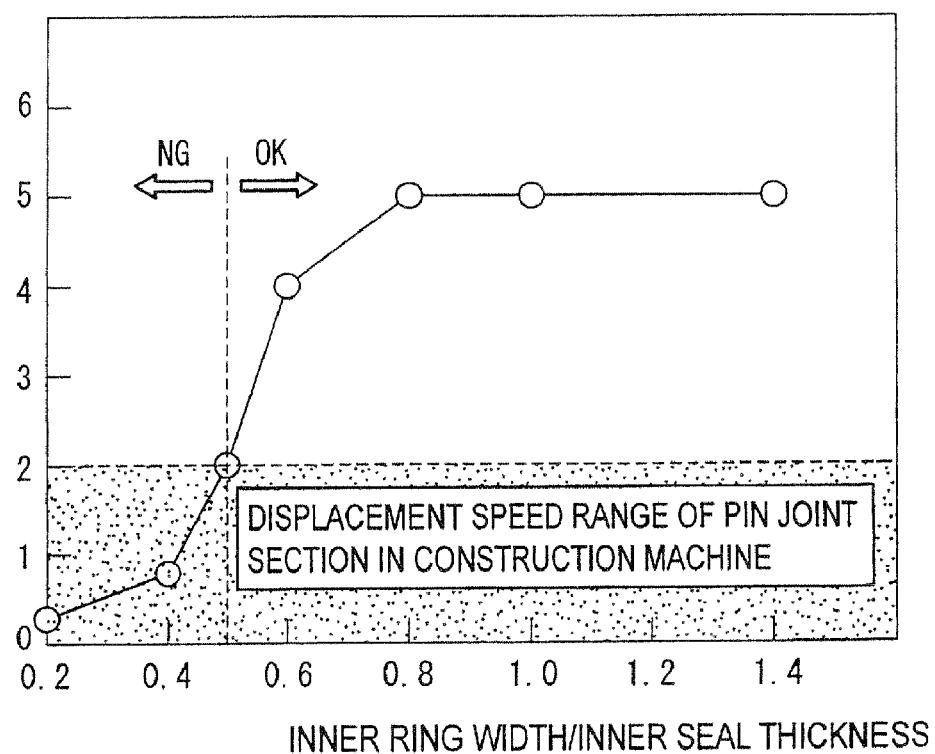
FIG. 41 is a chart showing a relation between the ratio of inner ring width to inner seal thickness and sealing performance (experimental example)

Further, the inner ring 20 also can be arranged only in the vicinity of the end of the outer cylinder 33 of the inner seal 30. FIG. 41 shows, in this case, the relation between the ratio of the width W of the inner ring 20 along the axial direction of the pin 50 to the thickness h of the inner seal 30 and the generation speed of leakage (m/s), namely the displacement speed (m/s) of the pin 50 in the radial direction.

The relation as shown in FIG. 41 is the experimental result on a pin joint section of a construction machine in which the elastic material having a rubber hardness of 70° is used for the inner seal 30, and the elastic material having a rubber hardness of 30° is used for the outer seal 10.

The relation is indicated assuming a horizontal axis to be the value of (the width W of the inner ring 20/the thickness h of the inner seal 30) and a vertical axis to be the generation speed of leakage (m/s), namely the displacement speed (m/s) of the pin 50 in the radial direction.

As shown in FIG. 41, when the value of the horizontal axis is 0.5, the leakage from the bearing seal 60 occurs in the case where the displacement speed of the pin 50 in the radial direction reaches to 2 m/s, and the leakage does not occur in the case where the displacement speed is below 2 m/s. When the value of the horizontal axis is 0.8, the leakage from the bearing seal 60 does not occur until the displacement speed reaches to 5 m/s. When the value of the horizontal axis is 1.0 or 1.4 for example, the leakage from the bearing seal 60 does not occur even if the displacement speed reaches to 5 m/s.

In normal use of a construction machine, the displacement speed of the pin 50 of the pin joint section is usually no more than 2 m/s, and will not be larger than 5 m/s even in the case where the bucket of a hydraulic excavator, for example, is used to collide with the rock, concrete lump or the like to crush them. Thus, it will be sufficiently enduring for practical uses if the bearing seal can cope with the displacement of the pin 50, namely the generation speed of leakage, of 2 m/s.

In other words, the bearing seal can cope with the displacement of the pin 50, namely the generation speed of leakage, sufficiently if the value of (the width W of the inner ring 20/the thickness h of the inner seal 30) is set larger than 0.5.

EXAMPLE 2

FIG. 27 and FIG. 28 are partial cross sections showing examples of forming a ring-shaped rigid portion in the abutting portion of the inner seal to the outer seal. FIG. 27 shows an example in which the ring-shaped rigid portion 18 is formed by setting the thickness of the outer cylinder 33 of the inner seal 30 large. Further, FIG. 28 shows an example in which a heat hardening processing is applied to the outer surface 33a of the outer cylinder 33 of the inner seal 30 so that the ring-shaped rigid portion 18 is formed by the outer surface 33a. As shown in FIG. 28, by applying the hardening treatment to the outer surface 33a of the outer cylinder 33, the thickness of the inner seal 30 can be set small.

Also, instead of applying the hardening treatment to the outer surface 33a of the outer cylinder 33, a hard material can be fixed to the outer cylinder 33 of the inner seal by suitable fixing means such as adhering, welding or bonding. In such a case, it is preferred that the material having small elastic elongation is used as the hard material.

EXAMPLE 3

FIG. 29 and FIG. 30 are partial cross sections showing examples of forming a ring-shaped rigid portion in abutting portion of the outer seal to the inner seal. FIG. 29 shows an example in which the ring-shaped rigid portion 18 is formed by setting the thickness of the inner cylinder 13 of the outer seal 10 large. Further, FIG. 30 shows an example in which a heat hardening processing is applied to the inner surface 13b of the inner cylinder 13 of the outer seal 10 so that the ring-shaped rigid portion 18 is formed by the inner surface 13b. As shown in FIG. 30, by applying the hardening treatment to the inner surface 13b of the inner cylinder 13, the bearing seal 60 can be made small.

Also, instead of applying the hardening treatment to the inner surface 13b of the inner cylinder 13, a hard material can be fixed to the inner cylinder 13 by suitable fixing means such as adhering, welding or bonding. In such a case, it is preferred that the material having small elastic elongation is used as the hard material.

EXAMPLE 4

Figure 31:
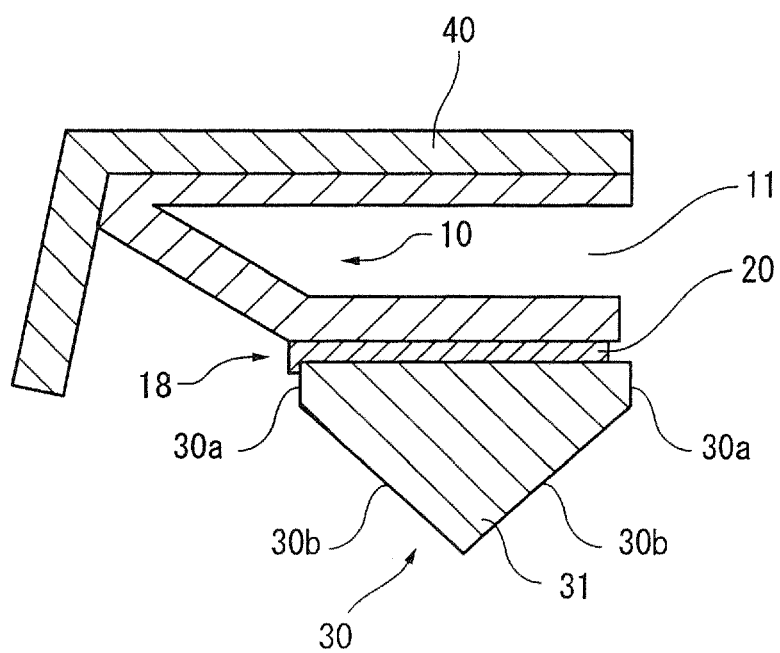
FIG. 31 is a cross section showing a modification of a seal lip (Example 4)

FIG. 31 shows an example in which the seal lip 31 has a substantially triangular cross section, in which the two end surfaces 30a of the inner seal 30 near the outer periphery are parallel to each other, and the two end surfaces 30b near the inner periphery intersect with each other to form a substantially V-shape, thereby forming the seal lip 31.

Though FIG. 31 shows an example in which the inner ring 20 as the ring-shaped rigid portion 18 is the same as used in the Example 1, the inner ring 20 as the ring-shaped rigid portion 18 is not limed thereto but can be the ring-shaped rigid portion 18 similar to that as used in the Example 2 or Example 3.

It should be noted that the configurations of the present invention are not limited to the aforementioned Examples 1 to 4 but can be varied as long as the objects of the present invention can be achieved. For example, the material and structure of the outer seal 10, the ring-shaped rigid portion 18 and the inner seal 30 can be changed. In such a case, the restoring force of the outer seal 10 and the inner seal 30 corresponding to the constant displacement in the radial direction, namely the spring constant of the outer seal 10 and the inner seal 30, is required to be so set that the spring constant of the inner seal 30 is larger than that of the outer seal 10.

Figure 40:
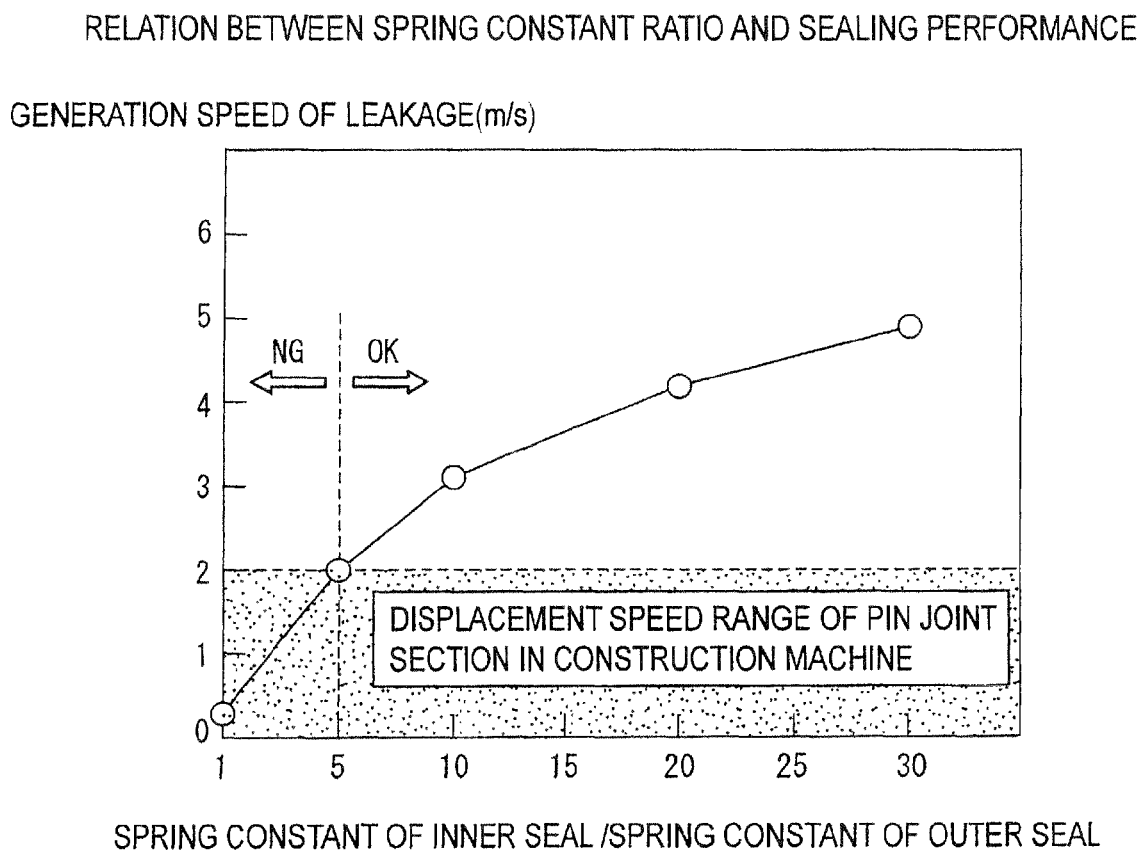
FIG. 40 is a chart showing a relation between spring constant ratio and sealing performance (experimental example)

Particularly, as shown in FIG. 40, it is preferred that the value of (the spring constant of the inner seal/the spring constant of the outer seal) is set to approximate 5 or more. The relation as shown in FIG. 40 is the experimental result on a pin joint section of a construction machine in which the elastic material having a rubber hardness of 70° is used for the inner seal 30, and the elastic material having a rubber hardness of 30° is used for the outer seal 10. The relation is indicated assuming the horizontal axis to be the value of (spring constant of inner seal/spring constant of outer seal) and the vertical axis to be the generation speed of leakage (m/s), namely the displacement speed (m/s) of the pin 50 in the radial direction.

As shown in FIG. 40, when the value of (the spring constant of the inner seal/the spring constant of the outer seal) is 5, the leakage from the bearing seal 60 can be prevented until the displacement speed of the pin 50 in the radial direction reaches to 2 m/s. When the value of the horizontal axis is 10, the leakage from the bearing seal 60 does not occur until the displacement speed reaches to 3 m/s. When the value of the horizontal axis is 20, the leakage from the bearing seal 60 does not occur until the displacement speed reaches to 4 m/s, and when the value of the horizontal axis is 30, the leakage from the bearing seal 60 does not occur until the displacement speed reaches to 5 m/s.

In normal use of a construction machine, the displacement speed of the pin 50 of the pin joint section is usually no more than 2 m/s, and will not be larger than 5 m/s even in the case where the bucket of a hydraulic excavator, for example, is used to collide with the rock, concrete lump or the like to crush them. Thus, it will be sufficiently enduring for practical uses if the bearing seal can cope with the displacement of the pin 50, namely the generation speed of leakage, of 2 m/s.

Thus, the bearing seal can cope with the displacement of the pin 50 of the pin joint section of a construction machine sufficiently if the value of (the spring constant of the inner seal/the spring constant of the outer seal) is set larger than approximate 5.

EXAMPLE 5

FIG. 33 to FIG. 37 show examples in which a metal ring 40 for preventing the displacement of the outer seal 10 in the axial direction is constituted by a first metal ring 41 and a second metal ring 42, the metal ring 40 being fixed to the boss 51. Since the outer seal 10 is easier to be deformed than the inner seal 30, when the grease or the like is being injected into between the pin 50 and the boss 51 from the left in the FIG. 33, there is possibility that the inner seal 30 is displaced together with the outer seal 10 in the axial direction of the pin 50 before the seal lip 31 of the inner seal 30 is displaced in the direction indicated by the arrow "a" in the figure due to the injection pressure of the grease.

In such a case, since the grease will not leak out from between the seal lip 31 of the inner seal 30 and the pin 50, whether or not the grease is properly injected can not be confirmed through checking the leakage of the grease from between the seal lip 31 and the pin 50. Further, if the inner seal 30 is displaced in the axial direction, the contact angle of the seal lip 31 with the pin 50 will change, therefore sealing performance may be decreased, and the seal lip 31 may be damaged due to contacting with other portion.

Thus, the first metal ring 41 and the second metal ring 42 are used to prevent the outer seal 10 from being displaced in the axial direction, and thereby the inner seal 30 is prevented from being displaced together with the outer seal 10 in the axial direction. Thus, since the grease can leak out from between the seal lip 31 and the pin 50 due to the displacement of the seal lip 31 in the direction indicated by the arrow "a" when injecting the grease, whether or not the grease is properly injected can be confirmed.

For example, FIG. 32 shows a configuration in which the pin 50 is supported by the bracket 52, the bearing seal 60 is arranged between the pin 50 and the boss 51, and the grease is injected into between the boss 51 and the pin 50 from a nipple 54.

In the above, whether or not the grease is properly injected can not be confirmed through checking the leakage of the injected grease from between the boss 51 and the bracket 52.

Thus, as explained above, if the outer seal 10 is displaced in the axial direction and the inner seal 30 is also displaced in the axial direction together with the outer seal 10, the seal lip 31 will be displaced in the direction indicated by the arrow "a", therefore the grease will not leak out, and whether or not the grease is properly injected can not be confirmed.

In this example, the metal ring 40 has a first metal ring 41 and a second metal ring 42, a cylinder 41a of the first metal ring 41 being engaged with a cylinder 42a of the second metal ring 42, and the cylinder 42a of the second metal ring 42 being engaged with the boss 51.

An inward flange 41b of the first metal ring 41 abuts on the connection piece 14 of the outer seal 10, an inward flange 42b of the second metal ring 42 either respectively abuts on the cylinder 41a of the first metal ring 41, the outer cylinder 12, the inner cylinder 13, and the inner ring 20, or respectively faces the same via clearance.

In this example, the inner cylinder 13 of the outer seal 10 has its portion near the other end in the width direction arranged parallel to the pin 50, while the portion near the other end in the width direction being diametrically expanded toward the outside in a taper shape.

Further, the inner ring 20 is fixed to the parallel portion near the other end in the width direction.

The inner ring 20 has a cylinder 21 and an inward flange 22, and an axial one end portion 32 of the inner seal 30 is fixed to the inward flange 22.

The inner seal 30 is parallel to the pin 50, and is formed in a funnel shape so that the seal lip 31 (an axial other end portion) is located inside the axial one end portion 32. The seal lip 31 is formed so as to be easily displaced in the direction indicated by the arrow "a" by the injected grease or the like as described above.

It should be noted that the inner ring 20 as the ring-shaped rigid portion 18 is not limited to as shown in the drawings but can take any of the configurations of the ring-shaped rigid portion 18 as described in aforementioned Examples 1 to 4.

Figure 34:
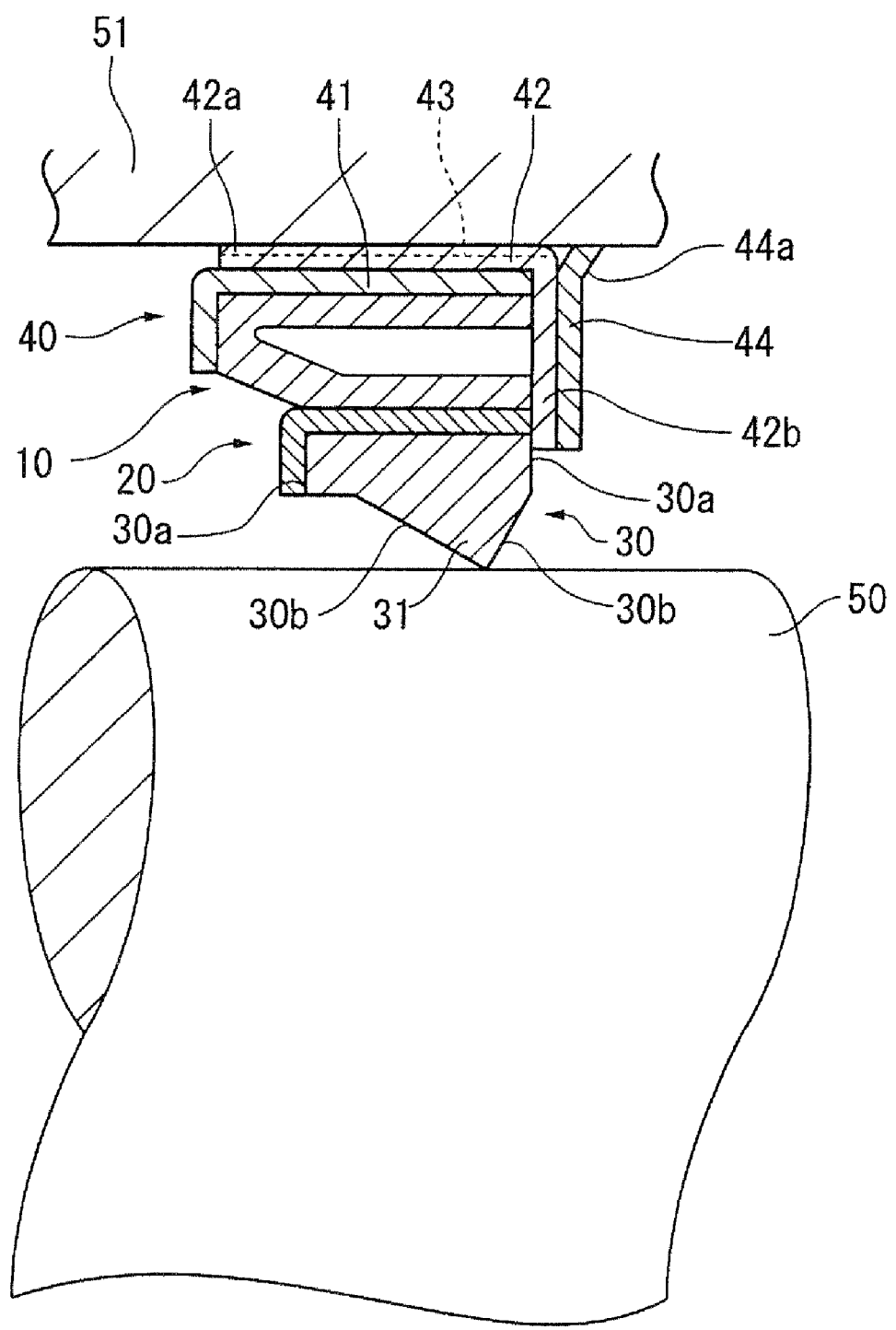
FIG. 34 is a cross section showing a modification of a usage of a metal ring (Example 5)

FIG. 34 shows an example in which the seal lip 31 of the inner seal 30 has a substantially triangular cross section.

The two end surfaces 30a of the inner seal 30 near the outer periphery are parallel to each other, and the two end surfaces 30b near the inner periphery intersect with each other to form a V-shape, thereby forming the seal lip 31.

Since the seal lip 31 of the inner seal 30 is difficult to be deformed by the injected grease or the like as described above, breather grooves 43 are formed in the cylinder 42a of the second metal ring 42 so that the grease can leak out from the breather grooves 43.

The breather grooves 43 with narrow width are formed in the circumferential direction at an interval, each extending contiguously in the axial direction and opening to the outer peripheral surface of the cylinder 42a.

In such a case, since earth and sand might enter into between the pin 50 and the boss 51 from the breather grooves 43, a breather groove lip seal 44 is provided so that earth and the like is prevented from entering through the breather grooves 43, while the grease can leak out from the breather grooves 43.

For example, it is possible to create a configuration in which the breather groove lip seal 44 is fixed to the second metal ring 42, and a taper-shaped outer peripheral edge part 44a of the breather groove lip seal 44 is abutted to the boss 51, so that the outer peripheral edge part 44a will be displaced away from the boss 51 by the grease leaked out from the breather grooves 43, while earth and the like will not enter the breather grooves 43 because the outer peripheral edge part 44a is brought into press-contact with the boss 51 by the acting force of the dust.

It is preferred that the breather groove lip seal 44 is made of, for example, NBR with NBR hardness 30°, and the spring constant of the inner seal 30 is set to approximate five times as great as that of the outer seal 10.

Figure 35:
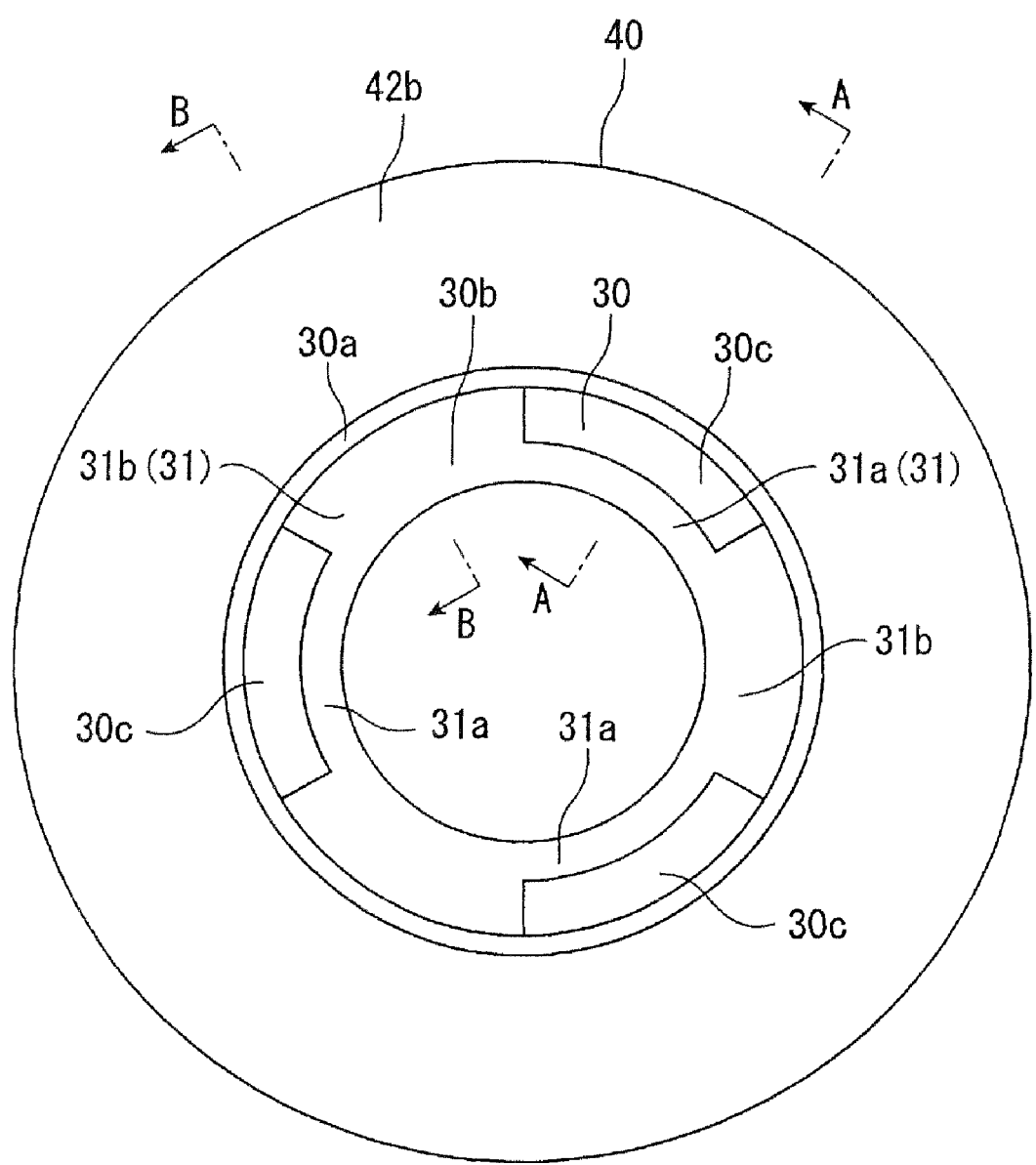
FIG. 35 is a front elevational view showing another modification of a usage of a metal ring (Example 5)
Figure 36:
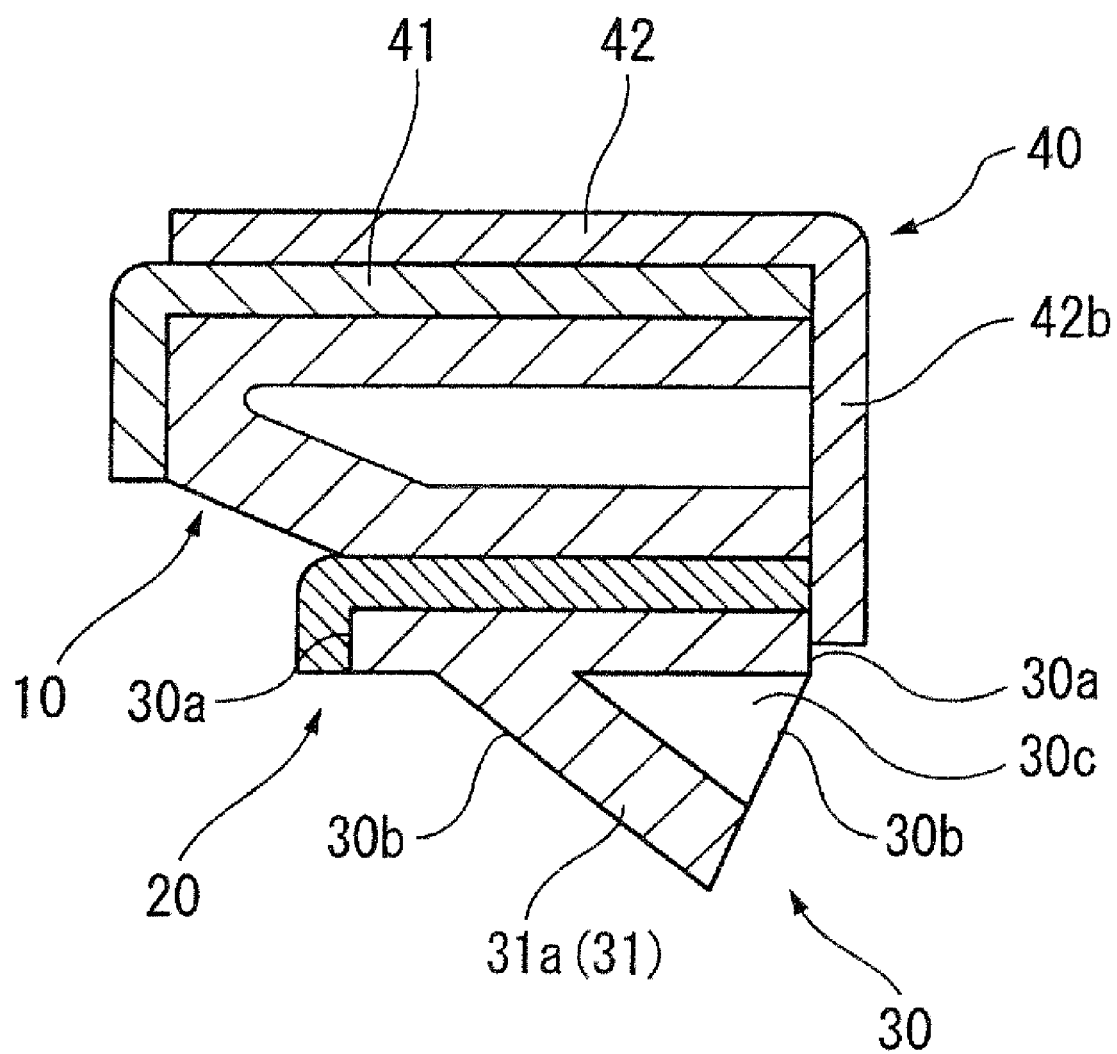
FIG. 36 is cross section taken along line A-A of FIG. 35 (Example 5)
Figure 37:
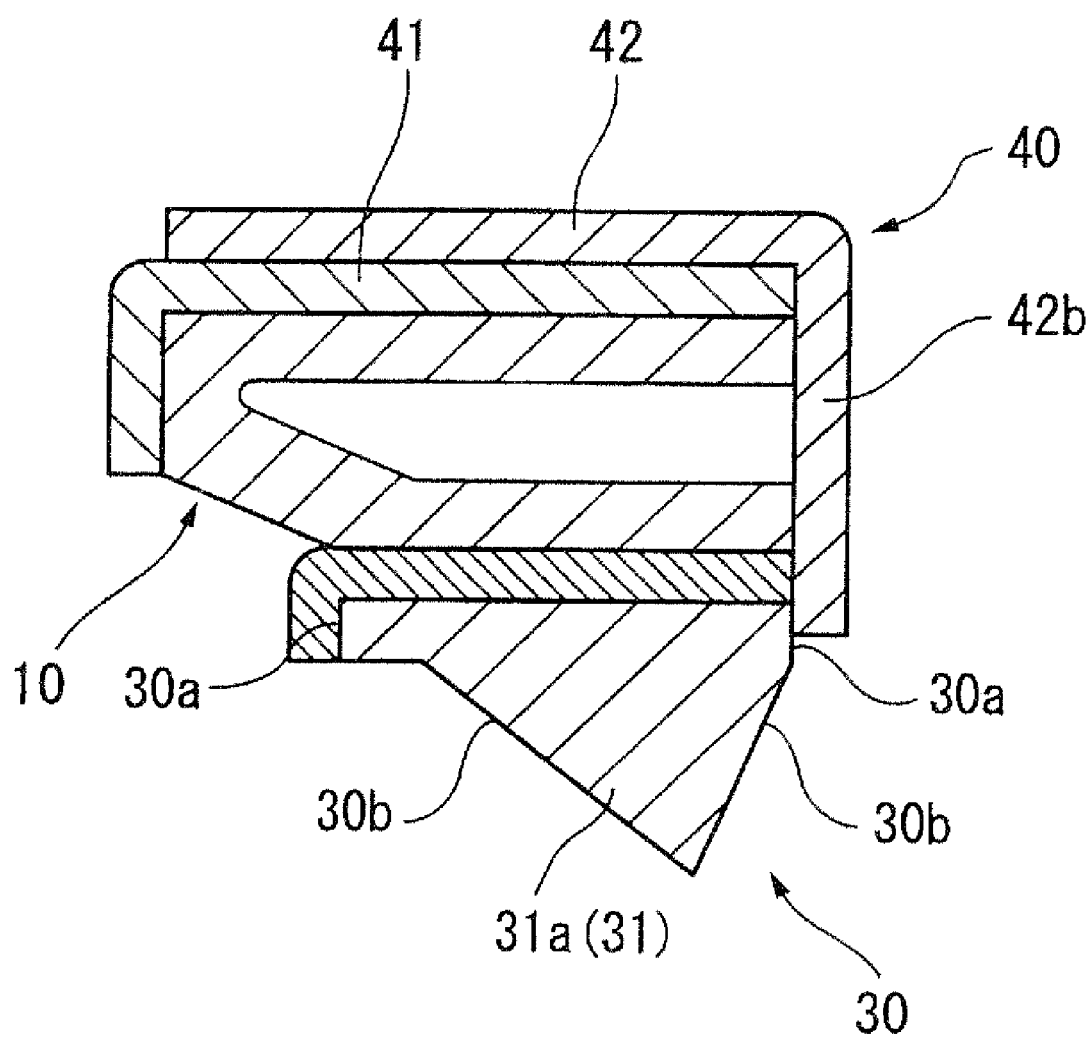
FIG. 37 is cross section taken along line B-B of FIG. 35 (Example 5)

FIG. 35 to FIG. 37 show another modification of the inner seal 30 in which the seal lip 31 of the inner seal 30 has a plurality of tongue-shaped cross-sectioned portions 31a and triangular cross-sectioned portions 31b alternately arranged in the circumferential direction.

For example, the configuration can be such that the two end surfaces 30a of the inner seal 30 near the outer periphery are parallel to each other, the two end surfaces 30b near the inner periphery intersect with each other to form a V-shape, and a plurality of V-shaped concave portions 30c are formed in the circumferential direction of one of the end surfaces 30b near the inner periphery at an interval, the part forming the concave portions 30c being the end surfaces 30a, and the rest being the triangle sectioned portion.

With this configuration, the tongue-shaped cross-sectioned portions 31a of the seal lip 31 can be deformed when injecting the grease so that the injected grease can leak out, and the sealing performance can be improved owing to the triangular cross-sectioned portions 31b of the seal lip 31.

EXAMPLE 6

Figure 38:
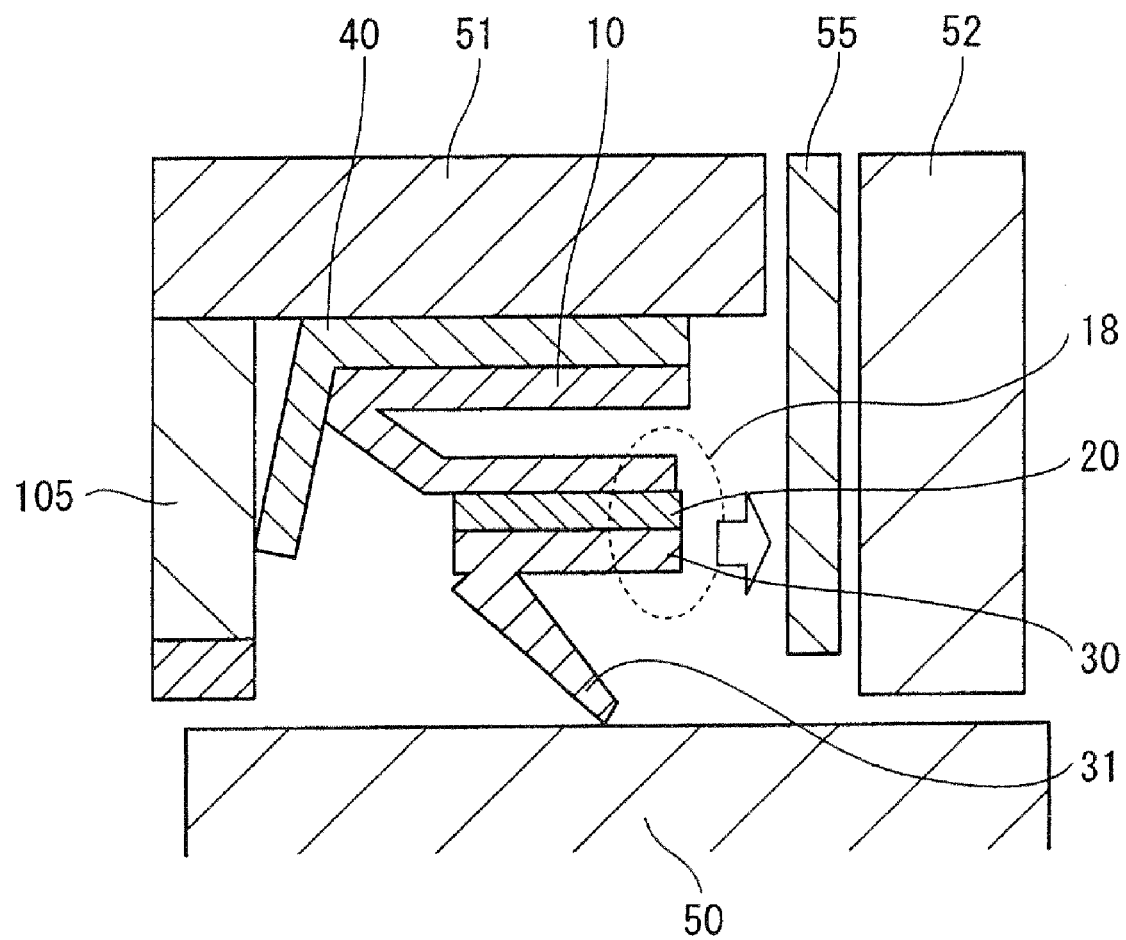
FIG. 38 is a cross section showing an example of preventing displacement of an outer ring in the axial direction (Example 6)
Figure 39:
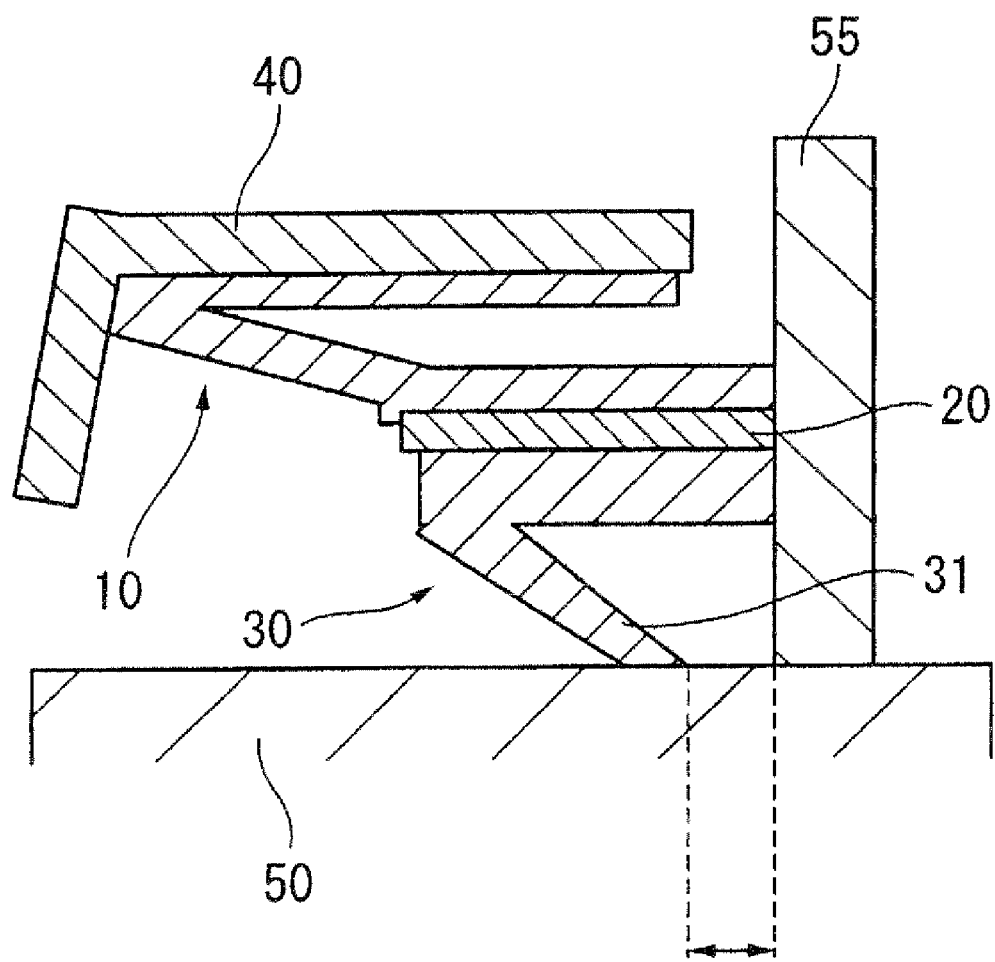
FIG. 39 is a partly enlarged view of FIG. 38 (Example 6)

FIG. 38 and FIG. 39 show an example in which the displacement of the outer seal 10 in the axial direction is prevented by bringing the ring-shaped rigid portion 18 into contact with the shim 55 arranged inside the bracket 52, instead of by providing the second metal ring 42 as described in Example 5. In other words, since the outer seal 10 is easier to be deformed than the inner seal 30, when the grease or the like is being injected into between the pin 50 and the boss 51 from the left in the FIG. 38, the displacement of the inner seal 30 together with the outer seal 10 in the axial direction of the pin 50 is prevented by, as shown in FIG. 39, bringing the inner ring 20 as the ring-shaped rigid portion 18 into contact with the shim 55.

As shown in FIG. 38, it is possible to create a configuration in which the inner ring 20 and the shim 55 are in the state of non-contact with each other in normal time, but the inner ring 20 and the shim 55 are brought into contact with each other if the outer seal 10 is somewhat displaced in the axial direction when performing grease up work, for example. It is preferred that the inner ring 20 and the shim 55 are separated from each other even when the inner ring 20 and the shim 55 are brought into contact with each other.

With this configuration, when performing grease up work, for example, the damage of the seal lip 31 caused by contact of the distal end thereof with the shim 55 due to the internal pressure of the injected grease can be prevented. In order to bring the inner ring 20 into contact with the shim 55 before the distal end of the seal lip 31 contacts the shim 55, it is preferred that the inner ring 20 is arranged between the outer seal 10 and the inner seal 30.

The end surface of the ring-shaped rigid portion 18, which contacts with the shim 55, is preferably made of the material as is used for the inner ring 20, which has high strength against abrasion and low frictional coefficient, such as SPCC steel for example. However, the end surface of the ring-shaped rigid portion 18 also can be made of the material identical to that of the inner seal 30 or the outer seal 10, or be made of hardening treated material of the inner seal 30 or the outer seal 10. Also, it should be noted that the member with which the ring-shaped rigid portion 18 or the outer seal 10 contact is not limited to the shim 55 but can be other member as long as the displacement of the ring-shaped rigid portion 18 or the outer seal 10 in the axial direction of the pin 5 can be prevented.

With this configuration, when performing grease up work for example, the leakage of the grease from between the seal lip 31 of the inner seal 30 and the pin 50 can be checked. Accordingly, the leakage of the grease from between the seal lip 31 and the pin 50 can be checked, and therefore whether or not the grease is properly injected can be confirmed. Further, the decreasing of the sealing performance and damage of the seal lip 31 due to contacting with other portion caused by the displacement of the inner seal 30 in the axial direction can be prevented.

In the aforementioned embodiments, though the grease is injected into between the pin 50 and the boss 51, the lubricant oil can be injected into between the pin 50 and the boss 51 instead of the grease. In such a case, the breather groove 43 and the breather groove lip seal 44 as shown in FIG. 25 are not necessary to be provided.

EXPERIMENTAL EXAMPLE

Next, the restoring force of the outer seal 10 after being elastically compressed due to the displacement of the pin 50 in the radial direction will be described.

Figure 33:
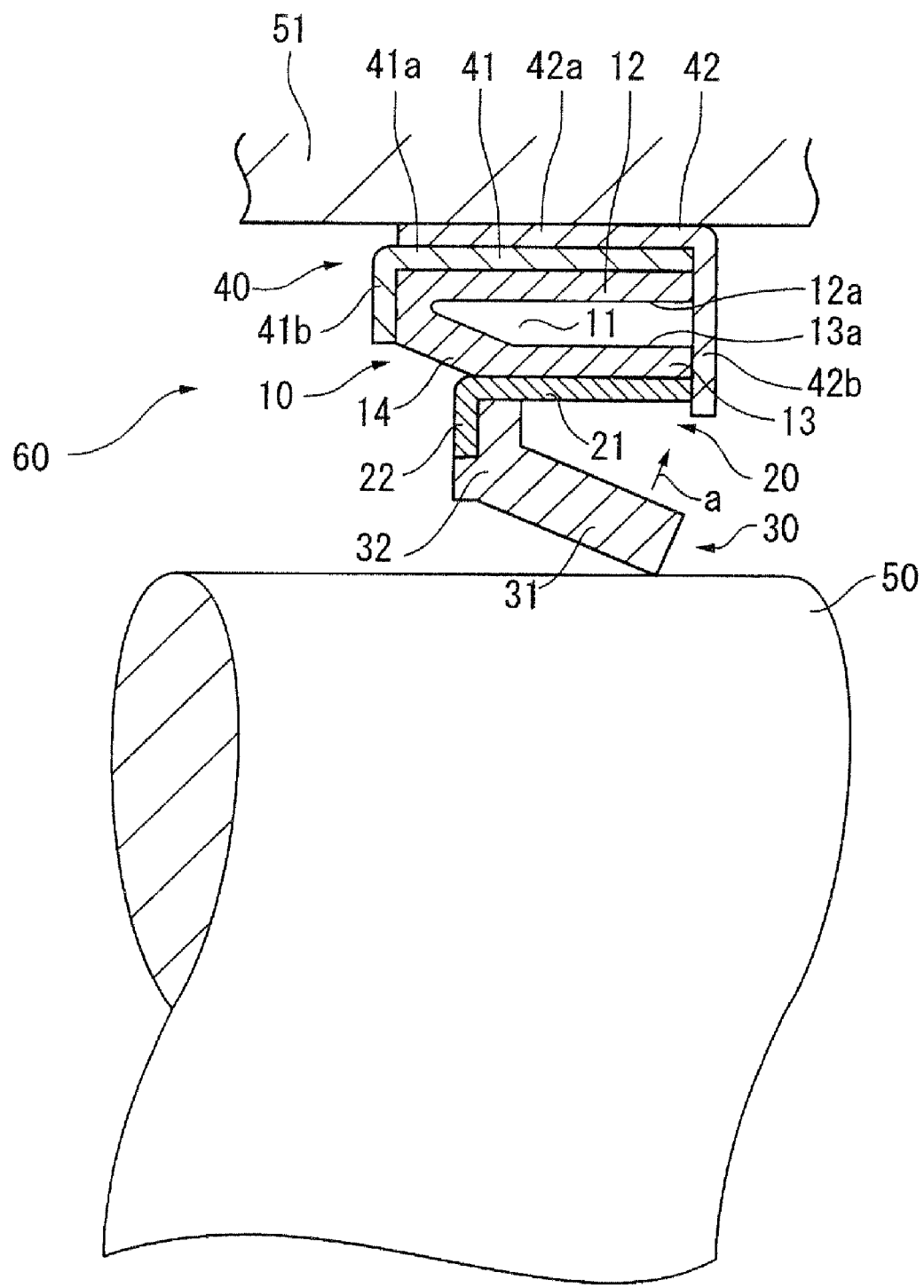
FIG. 33 is a cross section showing a usage of a metal ring (Example 5)

The restoring forces (kgf) corresponding to different displacements of the pin 50 were measured using bearing seals 60 with the inner ring 20 and the inner seal 30 having cross section as shown in FIG. 33, and with the outer seal 10 respectively having the cross section as shown in FIG. 33, a U-shaped cross section opened to one side, a solid cross section, and a pipe-like cross section.

Figure 42:
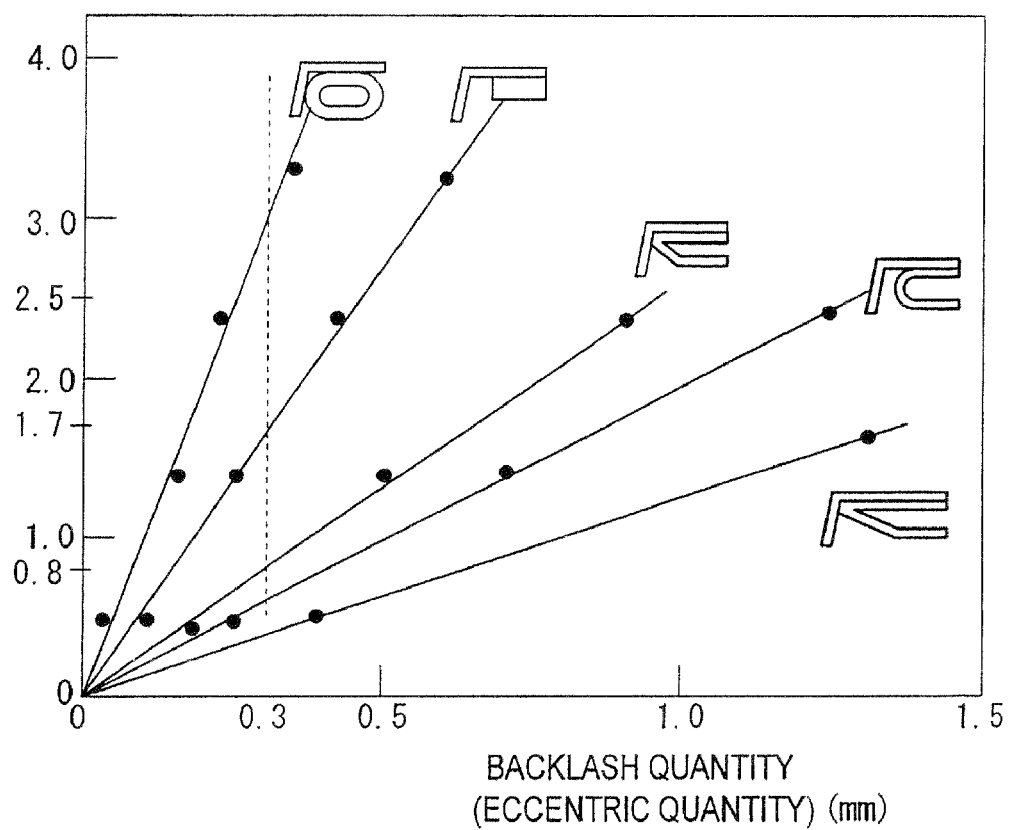
FIG. 42 is a chart showing a relation between restoring force and backlash quantity of the outer seal (experimental example)
Figure 43:
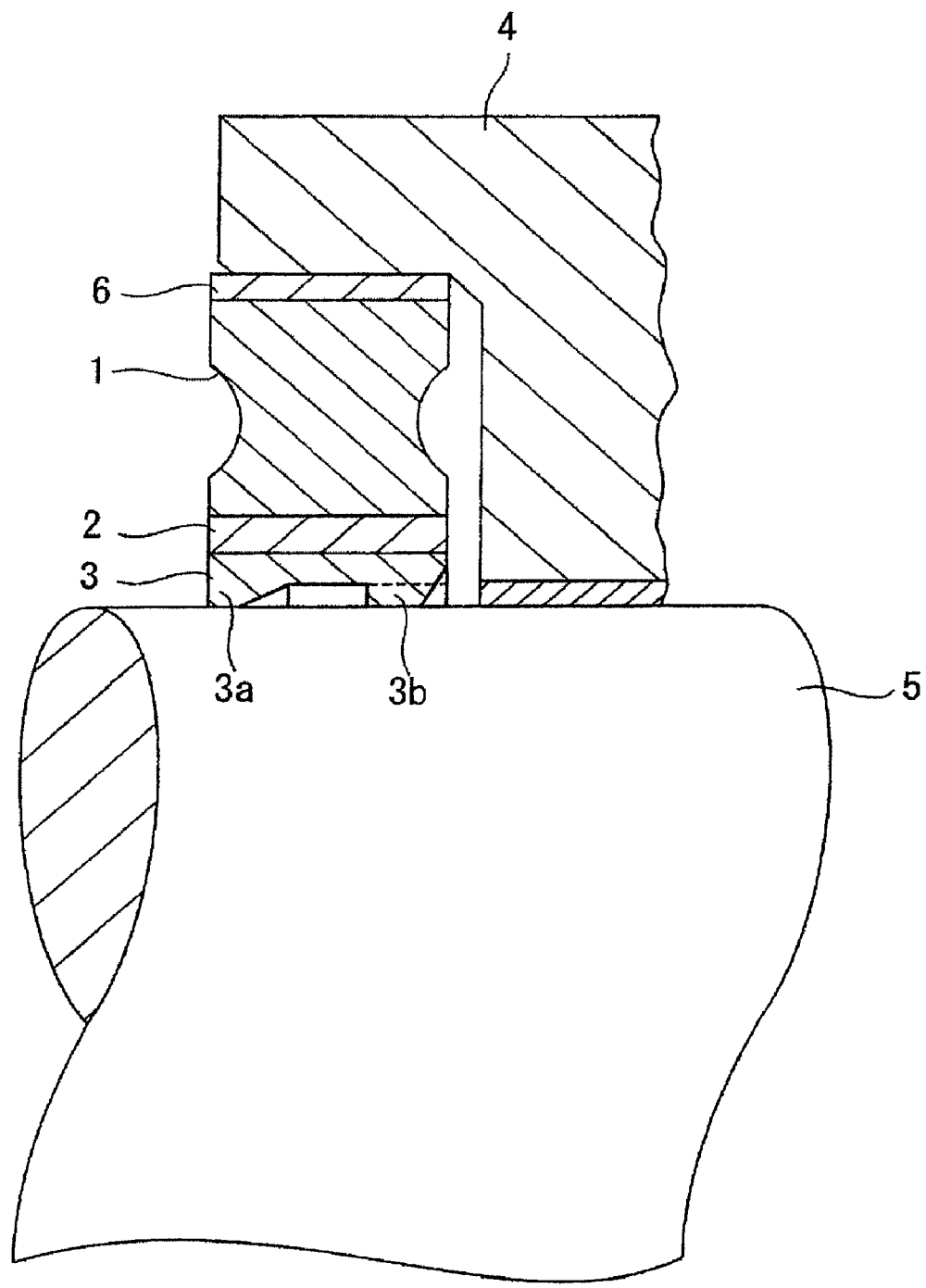
FIG. 43 is a cross section showing a bearing seal in a prior art (prior art).

The results were as shown in FIG. 42.

In FIG. 42, A is an outer seal having a pipe-like cross section, B is an outer seal having a solid cross section, C is an outer seal having a cross section as shown in FIG. 33, D is an outer seal having a U-shaped cross section opened to one side, and E is an outer seal having an axially long cross section as shown in FIG. 23. Also, the backlash quantity (eccentric quantity) is the size of the clearances between the pin 50 and the boss 51, and indicates the displacement of the pin.

From the above, it is proved that the outer seal 10 having a clearance 11 has small restoring force and good follow-up to the displacement of the pin, compared to the outer seal 10 having, for example, a pipe-like cross section, a solid cross section, or the like.

It is known that the backlash quantity of a pin hinge joint for a construction machine is approximately 0.3 mm. It is also known that when the backlash quantity is 0.3 mm, the restoring force of an outer seal having a solid cross section is 1.7 kgf, and the restoring force of the outer seal having the cross section as shown in FIG. 33 is 0.8 kgf.

Accordingly, in a bearing seal for a pin hinge joint for a construction machine, the restoring force should be no more than 1.7 kgf for the outer seal having a solid cross section, and no more than 0.8 kgf for the outer seal having the clearance as shown in FIG. 33, when the backlash quantity is 0.3 mm.

Further, in the bearing seal for a construction machine, it is preferred that the material for inner seal 30 satisfies the following requirement.

(1) Tension loss due to the settling is 30% or less after the elapse of 10,000 hours.

(2) Elastic deformation rate, as temperature characteristics, is 5% or higher in temperature range of −30° C. to 120° C.

Elastic deformation rate=elastic deformation of rubber/total deformation of rubber×100%

In other words, the total deformation of rubber is the sum of the elastic deformation (the deformation which conforms to Hooke's law) and the elastic after effect deformation (the deformation which is inferior in responsiveness).

Further, it is preferred that the value of (the spring constant of the elastic material for the inner seal 30/the spring constant of the elastic material for the outer seal 10) is approximate 5.

In the case where the inner ring 20 is used as the ring-shaped rigid portion 18, it is preferred that the value of the width of the inner ring 20/the thickness of the inner seal 30 is larger than 0.5.

INDUSTRIAL APPLICABILITY

The bearing seal of the present invention can be applied to a bearing seal used for a member which is displaced in the radial direction.

The invention claimed is:

1. A bearing seal that seals a space containing lubricant and defined in part by a shaft, the bearing seal comprising:
an outer seal;
a ring-shaped rigid portion; and
an inner seal made of elastic material;
wherein the ring-shaped rigid portion is arranged between the inner seal and the outer seal; and
wherein the inner seal has a single seal lip extending in a direction slanted relative to an axial direction of the shaft and toward an exterior of the space, the single seal lip being in contact with an outer circumference of the shaft when placed around the shaft.

2. The bearing seal according to claim 1, wherein the ring-shaped rigid portion is formed as a member separate from members constituting the inner seal and the outer seal.

3. The bearing seal according to claim 1, wherein, when the shaft is radially displaced relative to a bearing, the outer seal is more deformed than the inner seal.

4. The bearing seal according to claim 1, wherein the outer seal is made of elastic material.

5. The bearing seal according to claim 1, further comprising:
an outer ring made of a ring-shaped rigid material, the outer ring surrounding the outer seal.

6. The bearing seal according to claim 1, wherein the ring-shaped rigid portion has an L-shape cross section.

7. The bearing seal according to claim 1, wherein the outer seal includes:
an inner ring fixing portion fixed on an outer surface of an inner ring;
an outer ring fixing portion axially extending in a manner opposed to the inner ring fixing portion; and
an expandable portion that connects an end of the inner ring fixing portion and an end of the outer ring fixing portion remote from the space to define a C-shape cross section having an opening facing the space.

8. The bearing seal according to claim 1, further comprising a metal ring that extends along two sides of the outer seal to maintain a position of the outer seal.

9. A swing device comprising a shaft mounted on a first member; a bearing mounted on a second member and rotatably supporting the shaft; and a bearing seal arranged outside a bearing surface in an axial direction for sealing a space defined in part by the bearing surface from an outside; the bearing seal comprising:
an outer seal;
a ring-shaped rigid portion; and
an inner seal made of elastic material;
wherein the ring-shaped rigid portion is arranged between the inner seal and the outer seal; and
wherein the inner seal has a single seal lip extending in a direction slanted relative to an axial direction of the shaft and toward an exterior of the space, the single seal lip being in contact with an outer circumference of the shaft.

10. The swing device according to claim 9, wherein the ring-shaped rigid portion has an L-shape cross section.

11. The swing device according to claim 9, wherein the outer seal includes:
- an inner ring fixing portion fixed on an outer surface of an inner ring;
- an outer ring fixing portion axially extending in a manner opposed to the inner ring fixing portion; and
- an expandable portion that connects an end of the inner ring fixing portion and an end of the outer ring fixing portion remote from the space to define a C-shape cross section having an opening facing the space.

12. The swing device according to claim 9, further comprising a metal ring that extends along two sides of the outer seal to maintain a position of the outer seal.

\* \* \* \* \*